(12) United States Patent
Inada et al.

(10) Patent No.: US 9,850,356 B2
(45) Date of Patent: Dec. 26, 2017

(54) CELLULOSE ACYLATE FILM, POLARIZING PLATE AND LIQUID CRYSTAL DISPLAY DEVICE

(71) Applicant: FUJIFILM Corporation, Tokyo (JP)

(72) Inventors: Hiroshi Inada, Kanagawa (JP); Naozumi Shiraiwa, Kanagawa (JP); Yingjie Xu, Kanagawa (JP); Yasukazu Kuwayama, Kanagawa (JP); Nobutaka Fukagawa, Kanagawa (JP); Masaki Noro, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/843,757

(22) Filed: Sep. 2, 2015

(65) Prior Publication Data

US 2016/0060406 A1  Mar. 3, 2016

(30) Foreign Application Priority Data

Sep. 3, 2014 (JP) ................................. 2014-179684

(51) Int. Cl.
*G02F 1/1335* (2006.01)
*C08J 5/18* (2006.01)
*G02B 5/30* (2006.01)

(52) U.S. Cl.
CPC ............. *C08J 5/18* (2013.01); *C08J 2301/10* (2013.01); *C08J 2301/12* (2013.01); *G02B 5/3033* (2013.01); *G02F 1/133528* (2013.01); *Y10T 428/105* (2015.01)

(58) Field of Classification Search
CPC ....... C08J 2301/12; C08J 5/18; G02B 5/3033; G02F 1/133528; Y10T 428/105
See application file for complete search history.

(56) References Cited

U.S. PATENT DOCUMENTS

| | | | | | |
|---|---|---|---|---|---|
| 2,986,528 | A | * | 5/1961 | Siegrist | D06L 4/664 252/301.22 |
| 3,941,791 | A | * | 3/1976 | Hell | C07D 221/14 106/498 |
| 3,988,292 | A | | 10/1976 | Moriga et al. | |
| 4,234,728 | A | * | 11/1980 | Rody | C08K 5/34 524/100 |
| 4,415,689 | A | * | 11/1983 | Minagawa | C08K 5/34926 524/100 |
| 4,698,381 | A | * | 10/1987 | Minagawa | C07D 401/14 524/100 |

(Continued)

FOREIGN PATENT DOCUMENTS

| | | |
|---|---|---|
| JP | 2003-344655 A | 12/2003 |
| JP | 2006-022306 A | 1/2006 |

(Continued)

OTHER PUBLICATIONS

Dovlatyan et al. Armyanskii Khimicheskii Zhurnal, 28(4), pp. 306-310, 1975.*

(Continued)

*Primary Examiner* — Sophie Hon
(74) *Attorney, Agent, or Firm* — Edwards Neils LLC; Jean C. Edwards, Esq.

(57) ABSTRACT

An optical film comprising a cellulose acylate film which comprises a compound denoted by formula 2 below:

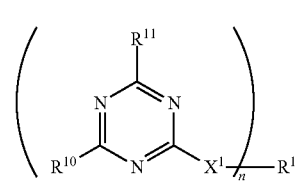

Formula 2 wherein each of $R^{10}$ and $R^{11}$ independently denotes a substituent linked to the triazine ring through —$NR^{12}$— or —CO—; $R^{12}$ denotes a hydrogen atom or an optionally substituted alkyl group; n denotes 1; and —$X^1$—$R^1$ is selected from the group consisting of partial structures 11 to 14:

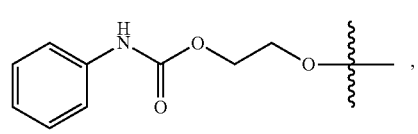

11

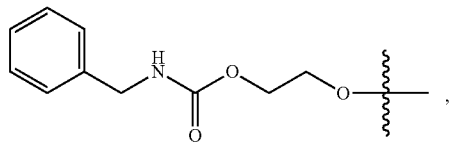

12

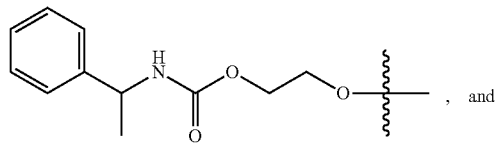

13 , and

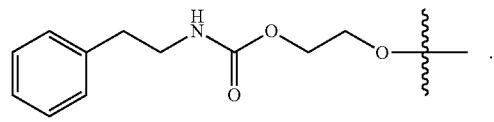

14 .

7 Claims, No Drawings

(56) References Cited

U.S. PATENT DOCUMENTS

| | | | |
|---|---|---|---|
| 5,269,815 A * | 12/1993 | Schlenker | D06M 23/105 |
| | | | 252/301.21 |
| 7,445,821 B2 | 11/2008 | Michihata | |
| 2005/0271834 A1 | 12/2005 | Michihata | |
| 2009/0252896 A1 * | 10/2009 | Nakayama | C08K 5/01 |
| | | | 428/1.1 |
| 2011/0073007 A1 | 3/2011 | Yasuda et al. | |
| 2013/0083274 A1 * | 4/2013 | Fujiwara | B32B 7/02 |
| | | | 349/96 |

FOREIGN PATENT DOCUMENTS

| | | | |
|---|---|---|---|
| JP | 2006-096023 A | | 4/2006 |
| JP | 2009084417 A | * | 4/2009 |
| JP | 2011-094120 A | | 5/2011 |
| JP | 2012-067218 A | | 4/2012 |
| JP | 2012067218 A | * | 4/2012 |
| JP | 2012-226060 A | | 11/2012 |
| JP | 2014-016596 A | | 1/2014 |

OTHER PUBLICATIONS

Office Action, issued by the Japanese Patent Office dated Jun. 6, 2017, in connection with Japanese Patent Application No. 2014-179684.

Office Action, issued by the Japanese Patent Office dated Oct. 10, 2017, in connection with Japanese Patent Application No. 2014-179684.

* cited by examiner

CELLULOSE ACYLATE FILM, POLARIZING PLATE AND LIQUID CRYSTAL DISPLAY DEVICE

CROSS-REFERENCE TO RELATED APPLICATIONS

This application claims priority under 35 U.S.C 119 to Japanese Patent Application No. 2014-179684 filed on Sep. 3, 2014. The above application is hereby expressly incorporated by reference, in its entirety.

BACKGROUND OF THE INVENTION

Field of the Invention

The present invention relates to a cellulose acylate film, a polarizing plate, and a liquid crystal display device.

Discussion of the Background

Cellulose acylate films are generally employed in various film members, for example, optical compensation films, protective films, and substrate films of display devices such as liquid crystal display devices. For example, JP-A-2012-67218 and JP-A-2006-22306, which are expressly incorporated herein by reference in their entirety, propose to add additives to such cellulose acylate films to enhance the performance.

SUMMARY OF THE INVENTION

Examples of two characteristics that are needed in practical terms when employing cellulose acylate films as protective films for polarizing plates and the like are given below.

The first characteristic is good scratch resistance. This is to prevent the generation of scratches on the film in the course of processing a cellulose acylate film, in the course of employing it as a protective film for a polarizing plate in a liquid crystal display device, and the like.

The second characteristic is a property of preventing from passing moisture, that is, low moisture permeability. The reason for this is as follows. When a film member that is contained in a liquid crystal display device performs poorly in terms of low moisture permeability, moisture passing through the film member runs the risk of causing dimensional changes (referred to as "deformation" hereinafter) and deterioration of parts constituting the liquid crystal display device. As an example, in a liquid crystal display device comprising a polarizing plate containing a polyvinyl alcohol film as a polarizer, there is a risk of deformation and deterioration of the polarizer due to moisture absorption of the polyvinyl alcohol. Such deformation and deterioration compromise the display performance of the liquid crystal display device (referred to as "image quality" hereinafter). Thus, in order to provide a liquid crystal display device with good image quality, it is preferable for the moisture permeability of the cellulose acylate film to be low (for there to be low moisture permeability).

The above JP-A-2012-67218 and JP-A-2006-22306 propose to add additives to cellulose acylate films. However, they do not describe improving the scratch resistance or reducing the moisture permeability of a cellulose acrylate film by means of additives.

An aspect of the present invention provides for a cellulose acylate film affording good scratch resistance and low moisture permeability.

The present inventors conducted extensive research into achieving the above cellulose acylate film. As a result, they discovered the cellulose acylate film containing the compound denoted by formula 1 below. The present invention was devised on that basis.

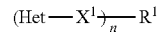

Formula 1

In formula 1, Het denotes an optionally substituted aromatic hetero ring. $X^1$ denotes a single bond or a group selected from the group consisting of —O—, —$NR^2$—, —$CR^3R^4$—, —S—, and —CO—. Each of $R^2$, $R^3$, and $R^4$ independently denotes a hydrogen atom or a substituent. $R^1$ denotes a partial structure of valence n, with n denoting an integer greater than or equal to 1. When n denotes an integer greater than or equal to 2, the plurality of Het and $X^1$ that are present can be identical or different. The compound denoted by formula 1 contains at least one group (also referred to as "functional group 1" hereinafter) selected from the group consisting of —NH— and —CO— per molecule, and contains at least one group (also referred to as "functional group 2" hereinafter) selected from the group consisting of —$X^2$—(C=$X^4$)—$X^3$—, —$NR^5$—($SO_2$)—, —CO—$NR^6$—CO, —O—, —S—, —COOH, —CN, —$NR^7R^8$, —OH, and —SH per molecule. Each of $X^2$ and $X^3$ independently denotes a single bond, —$NR^9$—, —O—, or —($CR^{10}R^{11}$)m—. Each of $R^5$, $R^6$, $R^7$, $R^8$, $R^9$, $R^{10}$, and $R^{11}$ independently denotes a hydrogen atom or an optionally substituted alkyl group. m denotes an integer greater than or equal to 1. $X^4$ denotes an oxygen atom or a sulfur atom. —CO— can also be written in the form —C(=O)—.

In one embodiment, in formula 1, the aromatic hetero ring denoted by Het is a nitrogen-containing aromatic hetero ring.

In one embodiment, the compound denoted by formula 1 contains at least one group selected from the group consisting of —$X^2$—(C=$X^4$)—$X^3$— and —$NR^5$—($SO_2$)—.

In one embodiment, in formula 1, n denotes an integer ranging from 1 to 6.

In one embodiment, the compound denoted by formula 1 contains at least one triazine ring.

In one embodiment, the compound denoted by formula 1 is the compound denoted by formula 2 below.

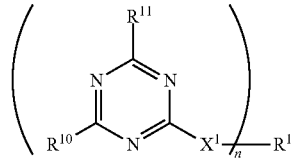

Formula 2

In formula 2, each of $R^{10}$ and $R^{11}$ independently denotes a hydrogen atom or a substituent. $X^1$, $R^1$, and n are each defined with the same definitions as in formula 1.

In one embodiment, in formula 2, each of $R^{10}$ and $R^{11}$ independently denotes a substituent linked to the triazine ring through —$NR^{12}$— or —CO—. $R^{12}$ denotes a hydrogen atom or an optionally substituted alkyl group.

In one embodiment, in formula 2, n denotes 1, at least either $R^{10}$ or $R^{11}$ denotes —$NR^{12}R^{13}$, and each of $R^{12}$ and $R^{13}$ independently denotes a hydrogen atom or an optionally substituted alkyl group.

In one embodiment, in formula 2, a ring structure is contained in at least one selected from the group consisting of $R^1$, $R^{10}$, and $R^{11}$.

In one embodiment, the above ring structure is an optionally substituted aromatic hydrocarbon ring.

In one embodiment, in formula 2, n denotes 2 and the partial structure denoted by $R^1$ contains at least one group selected from the group consisting of —NH— and —CO—.

In one embodiment, in formula 2, the partial structure denoted by $R^1$ contains at least one group denoted by —NH—$X^5$—NH—, and $X^5$ denotes an optionally substituted alkylene group.

In one embodiment, in formula 2, a ring structure is contained in at least one selected from the group consisting of $R^{10}$ and $R^{11}$.

In one embodiment, the above ring structure is an optionally substituted aromatic hydrocarbon ring.

In one embodiment, the compound denoted by formula 1 contains at least one linking group containing a bond selected from the group consisting of —NH—CO—O—$X^6$—, —$X^7$—NH—CO—O—, —NH—CO—$NR^{21}$—$X^8$—, and —$NR^{22}$—CO—NH—$X^9$— per molecule; each of $X^6$ to $X^9$ independently denotes an optionally substituted alkylene group; and each of $R^{21}$ and $R^{22}$ independently denotes a hydrogen atom or an alkyl group having 1 to 3 carbon atoms.

In one embodiment, the content of the compound denoted by formula 1 falls within a range of 1.0 to 50.0 weight parts per 100.0 weight parts of cellulose acylate.

Another aspect of the present invention relates to a polarizing plate comprising the above cellulose acylate film and a polarizer.

Still another aspect of the present invention relates to a liquid crystal display device comprising the above polarizing plate.

An aspect of the present invention can provide a cellulose acylate film having good scratch resistance and low moisture permeability. An aspect of the present invention can further provide a polarizing plate comprising the above cellulose acylate film and a liquid crystal display device comprising the above polarizing plate.

Other exemplary embodiments and advantages of the present invention may be ascertained by reviewing the present disclosure.

DETAILED DESCRIPTION OF THE EMBODIMENTS

The present invention will be described in greater detail below. In the present invention, a range stated using the word "to" includes the preceding and succeeding numeric values as minimum and maximum values, respectively. In the present invention, unless specifically stated otherwise, the "group" in an alkyl group or the like can optionally have substituent(s). The number of carbon atoms in a group, the number of carbon atoms of which has been limited, is a number that includes the carbon atoms present on substituent(s).

Examples of the substituents are substituents selected from substituent group T below. Unless specifically stated otherwise, the substituents in the present invention refer to substituents selected from substituent group T below.

Substituent Group T:

Alkyl groups (preferably having 1 to 20, more preferably having 1 to 12, and further preferably having 1 to 8 carbon atoms, such as methyl groups, ethyl groups, isopropyl groups, tertbutyl groups, n-octyl groups, n-decyl groups, n-hexadecyl groups, cyclopropyl groups, cyclopentyl groups, and cyclohexyl groups); alkenyl groups (preferably having 2 to 20, more preferably having 2 to 12, and further preferably having 2 to 8 carbon atoms, such as vinyl groups, allyl groups, 2-butenyl groups, and 3-pentenyl groups); alkynyl groups (preferably having 2 to 20, more preferably having 2 to 12, and further preferably, having 2 to 8 carbon atoms, such as propargyl groups and 3-pentynyl groups); aryl groups (preferably having 6 to 30, more preferably having 6 to 20, and further preferably having 6 to 12 carbon atoms, such as phenyl groups, biphenyl groups, and naphthyl groups); amino groups (preferably having 0 to 20, more preferably having 0 to 10, and further preferably having 0 to 6 carbon atoms, such as amino groups, methylamino groups, dimethylamino groups, diethylamino groups, and dibenzylamino groups); alkoxy groups (preferably having 1 to 20, more preferably having 1 to 12, and further preferably having 1 to 8 carbon atoms, such as methoxy groups, ethoxy groups, and butoxy groups); aryloxy groups (preferably having 6 to 20, more preferably having 6 to 16, and further preferably having 6 to 12 carbon atoms, such as phenyloxy groups and 2-naphthyloxy groups); acryl groups (preferably having 1 to 20, more preferably having 1 to 16, and further preferably having 1 to 12 carbon atoms, such as acetyl groups, benzoyl groups, formyl groups, and pivaloyl groups); alkoxycarbonyl groups (preferably having 2 to 20, more preferably having 2 to 16, and further preferably having 2 to 12 carbon atoms, such as methoxycarbonyl groups and ethoxycarbonyl groups); aryloxycarbonyl groups (preferably having 7 to 20, more preferably having 7 to 16, and further preferably having 7 to 10 carbon atoms, such as phenyloxycarbonyl groups); acyloxy groups (preferably having 2 to 20, more preferably having 2 to 16, and further preferably having 2 to 10 carbon atoms, such as acetoxy groups and benzoyloxy groups); acylamino groups (preferably having 2 to 20, more preferably having 2 to 16, and further preferably having 2 to 10 carbon atoms, such as acetylamino groups and benzoylamino groups); alkoxycarbonylamino groups (preferably having 2 to 20, more preferably having 2 to 16, and further preferably having 2 to 12 carbon atoms, such as methoxycarbonylamino groups); aryloxycarbonylamino groups (preferably having 7 to 20, more preferably having 7 to 16, and further preferably having 7 to 12 carbon atoms, such as phenyloxycarbonylamino groups); sulfonylamino groups (preferably having 1 to 20, more preferably having 1 to 16, and further preferably having 1 to 12 carbon atoms, such as methanesulfonylamino groups and benzenesulfonylamino groups); sulfamoyl groups (preferably having 0 to 20, more preferably having 0 to 16, and further preferably having 0 to 12 carbon atoms, such as sulfamoyl groups, methylsulfamoyl groups, dimethylsulfamoyl groups, and phenylsulfamoyl groups); carbamoyl groups (preferably having 1 to 20, more preferably having 1 to 16, and further preferably having 1 to 12 carbon atoms, such as carbamoyl groups, methylcarbamoyl groups, diethylcarbamoyl groups, and phenylcarbamoyl groups); alkylthio groups (preferably having 1 to 20, more preferably having 1 to 16, and further preferably having 1 to 12 carbon atoms, such as methylthio groups and ethylthio groups); arylthio groups (preferably having 6 to 20, more preferably having 6 to 16, and further preferably having 6 to 12 carbon atoms, such as phenylthio groups); sulfonyl groups (preferably having 1 to 20, more preferably having 1 to 16, and further preferably having 1 to 12 carbon atoms, such as mesyl groups and tosyl groups); sulfinyl groups (preferably having 1 to 20, more preferably having 1 to 16, and further preferably having 1 to 12 carbon atoms, such as methanesulfinyl groups and benzenesulfinyl groups); urethane groups; ureido groups (preferably having 1 to 20, more preferably having 1 to 16, and further preferably having 1 to 12 carbon atoms, such as ureido groups, methylureido groups, and phenylureido groups); phosphoramide groups (preferably having 1 to 20, more preferably having 1 to 16, and further preferably having 1 to 12 carbon atoms, such as diethyl phosphoramide and phenyl phosphoramide); hydroxyl groups; mercapto groups; halogen atoms (such as fluorine, chlorine, bromine, and iodine atoms); cyano groups; sulfo groups; carboxyl groups; nitro groups; hydroxamic acid groups; sulfino groups; hydrazino groups; imino groups; heterocyclic groups (preferably having 1 to 30, more preferably having 1 to 12 carbon atoms, comprising hetero atoms in the form of nitrogen atoms, oxygen atoms, and sulfur atoms by way of example, specific examples being imidazolyl groups, pyridyl groups, quinolyl groups, furyl groups, piperidyl groups, morpholino groups, benzooxazolyl groups, benzimidazolyl groups, and benzothiazolyl groups); and silyl groups (preferably having 3 to 40, more preferably having 3 to 30, and further preferably having 3 to 24 carbon atoms, such as trimethylsilyl groups and triphenylsilyl groups).

These substituents can be further substituted. When two or more substituents are present, they can be identical or different. When possible, they can be linked to form a ring.

Cellulose Acylate Film

The cellulose acylate film of an aspect of the present invention contains the compound denoted by formula 1 above.

The present inventors assume the reasons for which the above cellulose acylate film affords good scratch resistance and low moisture permeability to be as follows.

The compound denoted by formula 1 contains at least one group selected from the group consisting of —NH— and —CO— per molecule. The present inventors presume that this can contribute to enhancing the scratch resistance of the cellulose acylate film. The present inventors also assume that an aromatic hetero ring contained in the compound denoted by formula 1 can also contribute to enhancing scratch resistance.

Further, the compound denoted by formula 1 contains at least one group selected from the group consisting of —$X^2$—(C=$X^4$)—$X^3$—, —$NR^5$—($SO_2$)—, —CO—$NR^6$—CO—, —O—, —S—, —COOH, —CN, —$NR^7R^8$, —OH, and —SH per molecule. The groups contained in the above group can have the property of forming hydrogen bonds with other functional groups, or so-called "hydrogen bond forming ability." Such groups are thought to be able to interact with polymer chains and local portions such as ester groups and hydroxyl groups that are present in cellulose acylate, reducing the interspace of the film. The present inventors assume that this can contribute to enhancing the surface hardness (Knoop hardness) of the cellulose acylate film. The present inventors also presume that this interaction can contribute to lowering the moisture permeability of the cellulose acylate film.

However, the above are just presumptions by the present inventors, and are not intended to limit the present invention in any way.

<Compound Denoted by Formula 1>

The above cellulose acylate film contains the compound denoted by formula 1. A single compound denoted by formula 1 can be employed, or two or more such compounds with differing structures can be combined in any ratio for use. The same applies to the various components set forth further below in the present invention.

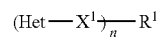

Formula 1

Formula 1 will be described in greater detail below.

(Het in Formula 1)

In formula 1, Het denotes an optionally substituted aromatic hetero ring. The aromatic hetero ring denoted by Het can be substituted or unsubstituted. Examples of substituents are those contained in substituent group T set forth above.

Examples of hetero atoms contained on the aromatic hetero ring are one or more hetero atoms selected from the group consisting of nitrogen atoms, oxygen atoms, and sulfur atoms. The number of hetero atoms contained on the aromatic hetero ring is at least one, preferably two or more, and, for example, one to three. However, this number is not specifically limited.

The aromatic hetero ring can be a single ring or can be a fused ring. In one embodiment, the aromatic hetero ring is preferably a single ring. The aromatic hetero ring preferably has 1 to 30, and preferably has 1 to 12, carbon atoms. A three to eight-membered aromatic hetero ring is preferable, and a five or six-membered one is preferred.

Specific examples of aromatic hetero rings are triazine rings, pyrimidine rings, tetrazole rings, triazole rings, imidazole rings, pyrrole rings, thiophene rings, furan rings, thiazole rings, oxazole rings, pyrazole rings, pyridine rings, pyrazine rings, quinoline rings, isoquinoline rings, quinazoline rings, oxadiazole rings, indole rings, benzimidazole rings, purine rings, quinoline rings, quinoxaline rings, coumarin rings, benzofuran rings, benzotriazole rings, carbazole rings, and acridine rings.

A preferable form of the aromatic hetero ring is an aromatic hetero ring (nitrogen-containing aromatic hetero ring) containing at least one nitrogen atom as a hetero atom. The nitrogen-containing aromatic hetero ring is preferably a triazine ring, pyrimidine ring, tetrazole ring, triazole ring, or imidazole ring, and more preferably a triazine ring.

The triazine ring can be a 1,2,3-triazine ring, 1,2,4-triazine ring, or 1,3,5-triazine ring, and is preferably a 1,3,5-triazine ring.

However, when the compound denoted by formula 1 contains just one 1,3,5-triazine ring per molecule, the 1,3,5-triazine ring satisfies at least either (i) or (ii) below. When the compound denoted by formula 1 is contains two or more 1,3,5-triazine rings per molecule, in one embodiment, at least one of the 1,3,5-triazine rings can satisfy either (i) or (ii) below. Further, in one embodiment, the two or more 1,3,5-triazine rings can satisfy either (i) or (ii).

(i) 1,3,5-triazine ring on which —$NH_2$ is not directly substituted.

(ii) 1,3,5-triazine ring on which a substituent containing at least one alkylene group is substituted in at least one of the positions 2, 4, and 6.

The compound denoted by formula 2 is an example of the compound denoted by formula 1 having a 1,3,5-triazine ring. The details are given further below.

($X^1$, $R^1$, and n in Formula 1)

In formula 1, $X^1$ denotes a single bond or a group selected from the group consisting of —O—, —$NR^2$—, —$CR^3R^4$—, —S—, and —CO—. Each of $R^2$, $R^3$, and $R^4$ independently denotes a hydrogen atom or a substituent. Examples of substituents are those contained in substituent group T set forth above. An optionally substituted alkyl group is preferable, an optionally substituted alkyl group having 1 to 4 carbon atoms is preferred, and an unsubstituted alkyl group having 1 to 4 carbon atoms is of greater preference. From the perspective of further enhancing scratch resistance, $X^1$ preferably denotes —$NR^2$— or —CO—, and more preferably denotes —NH— or —CO—.

In formula 1, $R^1$ denotes a partial structure of valence n, with n denoting an integer greater than or equal to 1. n preferably denotes an integer falling within a range of 1 to 6. n preferably denotes an integer less than or equal to 5, more preferably less than or equal to 4, and further preferably, less than or equal to 3.

When n denotes 1, in one embodiment, $R^1$ preferably contains at least one ring structure. The ring structure that is contained can be an aromatic ring structure or an alicyclic structure. An aromatic ring structure is preferable. The aromatic ring structure can be an aromatic hydrocarbon ring, or an aromatic hetero ring. An aromatic hydrocarbon ring is preferable. An aromatic hydrocarbon ring having 6 to 30 (more preferably 6 to 20, further preferably 6 to 10) carbon atoms is preferable, and a substituted or unsubstituted benzene ring is preferable. Examples of substituents are alkyl groups, ether groups, ester groups, and amide groups. A benzene ring substituted with an alkyl group or an unsubstituted benzene ring is preferred. A benzene ring substituted with an alkyl group having 1 to 3 carbon atoms or an unsubstituted benzene ring is of greater preference.

The ring structure contained in $R^1$ can be present at any position on the partial structure denoted by $R^1$, but is preferably present on the terminal group of the compound denoted by formula 1.

When n denotes 1, in one embodiment, $R^1$ preferably contains at least one structure containing a polar group. In the present invention, the term "polar group" refers to the residue of a compound having a C log P value of less than or equal to 0.85. The P in C log P denotes the partition coefficient in an n-octanol-water system and can be measured using n-octanol and water. For this partition coefficient, an estimated value can also be obtained using a C log P value estimation program (the CLOGP program built into the PC model of Daylight Chemical Information Systems Corp.). The C log P value is calculated as a compound. In this calculation, the residue for which C log P is being obtained is inputted not as a radical or an ion, but as a complete molecule. For example, residues $B^1$ and $B^2$ are independently determined as the $B^1$—H and $B^2$—H portions along with the hydrogen atoms. A C log P value can be obtained as a value estimated empirically or by computational chemical techniques even for a structure that does not actually exist.

The above C log P value is preferably less than or equal to 0.50, more preferably less than or equal to 0.30, and further preferably, less than or equal to 0. From the perspective of compatibility with cellulose acylate, the C log P value of a polar group is preferably greater than or equal to −5.0. Specific examples of the polar group are cyano groups, cyclic or chain-like imide groups (such as phthalimide groups, succinimide groups, and hexahydrophthalimide groups), nitro groups, hydroxyl groups, sulfonamide groups, carbonamide groups, carboxyl groups, amino groups, a monovalent substituent denoted by —(NR)n1-(C=O)—OR (wherein R denotes a hydrogen atom or a substituent, the two instances of R can be identical or different, and n1 denotes 0 or 1), an aminocarbonyloxy group (—O—(C=O)—NRR, wherein R denotes a hydrogen atom or a substituent and the two instances of R can be identical or different), and an aminocarbonylamino group (—NR—(C=O)—NRR, wherein R denotes a hydrogen atom or a substituent, and the plurality of R that are present can be identical or different). Preferable examples of the polar group are cyano groups, imide groups, alkoxycarbonyl groups (—(C=O)—$OR^{100}$, wherein $R^{100}$ denotes an alkyl group), hydroxyl groups, alkylaminocarbonyloxy groups (—O—(C=O)—NR—$R^{100}$, wherein R denotes a hydrogen atom or a substituent and $R^{100}$ denotes an alkyl group), alkoxycarbonylamino groups (—NR—(C=O)—$OR^{100}$, wherein R denotes a hydrogen atom or a substituent and $R^{100}$ denotes an alkyl group), and alkylaminocarbonylamino groups (—NR—(C=O)—NR—$R^{100}$, wherein R denotes a hydrogen atom or a substituent, the two instances of R can be identical or different, and $R^{100}$ denotes an alkyl group).

The above imide group is preferably in the form of a cyclic imide group. The cyclic imide group is preferably a succinimide group, phthalimide group, or hexahydrophthalimide group.

The alkyl group denoted by $R^{100}$ is preferably an alkyl group having 1 to 3 carbon atoms. For alkylaminocarbonyloxy groups, methylaminocarbonyloxy groups in which $R^{100}$ denotes a methyl group and R denotes a hydrogen atom are preferred. Alkoxycarbonyl groups in which $R^{100}$ denotes an alkyl group having 1 to 3 carbon atoms are preferable, and methoxycarbonyl groups in which $R^{100}$ denotes a methyl group are preferred. Alkoxycarbonylamino groups in which $R^{100}$ denotes an alkyl group having 1 to 3 carbon atoms are preferable, and methoxycarbonylamino groups in which $R^{100}$ denotes a methyl group are preferred. Alkylaminocarbonylamino groups in which $R^{100}$ denotes an alkyl group having 1 to 3 carbon atoms are preferable, and methylaminocarbonylamino groups in which $R^{100}$ denotes a methyl group are more preferable.

Additionally, when n denotes an integer greater than or equal to 2, preferably in cases where n denotes 2, the partial structure denoted by $R^1$ preferably contains at least one group, more preferably contains two or more groups, and further preferably contains 2 to 6 groups selected from the group consisting of —NH— and —CO—. When two or more —NH— are contained in the partial structure denoted by $R^1$, it is preferable for —NH— and —NH— to be linked through a linking group. With regard to the linking group, $X^5$ in formula 2 is described further below.

When n denotes an integer greater than or equal to 2, the plurality of Het and $X^1$ that are present can be identical or different. The same applies to the partial structures that can be present in a plurality number contained in the compound denoted by formula 1 and in the compound denoted by formula 2, described further below.

(Functional Groups 1 and 2)

The compound denoted by formula 1 contains at least one group (functional group 1) selected from the group consisting of —NH— and —CO— per molecule and at least one group (functional group 2) selected from the group consisting of —$X^2$—(C=$X^4$)—$X^3$—, —$NR^5$—($SO_2$)—, —CO—$NR^6$—CO—, —O—, —S—, —COOH, —CN, —$NR^7R^8$, —OH, and —SH per molecule. The presumptions made by the present inventors in this regard are as set forth above.

Functional group 1 is also sometimes contained in functional group 2. The compounds denoted by formula 1 also include compounds in which at least one functional group 1 is contained as a group contained in functional group 2 and at least one functional group 1 is contained as a portion other than functional group 2. Compounds denoted by formula 1 can contain a functional group 1 in the form of at least one group selected from the group contained of —NH— and —CO—, or a combination of two or more such groups. Compounds denoted by formula 1 can contain a functional group 2 in the form of at least one group selected from the above group, or a combination of two or more such compounds.

Each of $X^2$ and $X^3$ above independently denotes a single bond, $-NR^9-$, $-O-$, or $-(CR^{10}R^{11})m-$. Each of $R^5$, $R^6$, $R^7$, $R^8$, $R^9$, $R^{10}$, and $R^{11}$ independently denotes a hydrogen atom or an optionally substituted alkyl group. m denotes an integer greater than or equal to 1. In $CR^{10}R^{11}$, two or more from the group consisting of the carbon atom (C), $R^{10}$, and $R^{11}$ can be linked to form a ring structure. Examples of the substituent substituted onto the optionally substituted alkyl group are the substituents contained in substituent group T above. In one embodiment, the optionally substituted alkyl group is preferably an optionally substituted alkyl group having 1 to 3 carbon atoms, more preferably an unsubstituted alkyl group having 1 to 3 carbon atoms, and further preferably, a methyl group, ethyl group, or isopropyl group.

$-NR^9-$ is preferably $-NH-$.

$-(CR^{10}R^{11})m-$ is an alkylene group that can be optionally substituted with an optionally substituted alkyl group. The alkyl group is preferably an unsubstituted alkyl group, more preferably an unsubstituted alkyl group with 1 to 4 carbon atoms. In $CR^{10}R^{11}$, it is preferable for at least either $R^{10}$ or $R^{11}$ to be a hydrogen atom, and both of them may be hydrogen atom.

In $CR^{10}R^{11}$, when the carbon atom (C), $R^{10}$, and $R^{11}$ are linked to form a ring structure, the ring structure that is formed can be either a saturated ring or an unsaturated ring. A saturated hydrocarbon ring or an unsaturated hydrocarbon ring is preferable, a saturated hydrocarbon ring or an unsaturated hydrocarbon ring with 1 to 12 carbon atoms is preferred, and an optionally substituted cyclohexane ring or an optionally substituted benzene ring is of greater preference. An example of the substituent is an alkyl group having 1 to 3 carbon atoms.

m denotes an integer greater than or equal to 1, preferably an integer falling within a range of 1 to 3. When m denotes an integer that is greater than or equal to 2, the plurality of $R^{10}$ and $R^{11}$ that are present can be identical or different.

$X^4$ denotes an oxygen atom or a sulfur atom, and preferably denotes an oxygen atom.

In the compound denoted by formula 1, the position at which functional group 1 is contained is not specifically limited; it suffices for it to be contained in at least one from the group consisting of Het, $X^1$, and $R^1$. However, when $-CO-$ is contained in Het, from the perspective of enhancing scratch resistance, it is preferable for $-CO-$ not to be contained in the ring structure of the aromatic hetero ring.

In one embodiment, the substituent that is substituted onto the aromatic hetero ring in Het is preferably substituted onto the aromatic hetero ring through $-NH-$ or $-CO-$. In one embodiment, $X^1$ preferably denotes $-NH-$ or $-CO-$. That is, in one embodiment, functional group 1 is preferably directly bonded to the aromatic hetero ring.

The number of functional groups 1 contained in formula 1 is at least one, more preferably 2 or further preferably 2 to 5, and still further preferably, 2 to 4 per molecule. As set forth above, embodiments in which functional group 1 is contained in functional group 2 are included in the compound denoted by formula 1. In that case, when counting functional group 1, that contained in functional group 2 is also counted.

The position at which functional group 2 is contained in the compound denoted by formula 1 is not specifically limited, either. It suffices for it to be contained in at least one from the group consisting of Het, $X^1$, and $R^1$.

When n denotes 1 in formula 1, functional group 2 is preferably contained in at least $R^1$ or $-X^1-R^1$. While being contained in $R^1$ or $-X^1-R^1-$, it is also preferably contained in a substituent that is substituted onto the aromatic hetero ring in Het.

When n denotes an integer that is greater than or equal to 2 in formula 1, functional group 2 is preferably contained in at least a substituent that is substituted onto the aromatic hetero group in Het, or in $R^1$ or $-X^1-R^1-$.

The number of functional group 2 contained in formula 1 is at least 1, more preferably 2 or further preferably 2 to 5, and further preferably, 2 to 4 per molecule.

As set forth above, functional group 1 is selected from the group consisting of $-NH-$ and $-CO-$. It is preferable for $-NH-$ and $-CO-$ to be linked, and for functional group 1 to be contained in the compound denoted by formula 1 as $-NH-CO-$. A preferable embodiment comprising such a linking group is one in which, from the perspectives of the scratch resistance and low moisture permeability of the cellulose acylate film, there is at least one linking group (referred to as "linking group A" hereinafter) containing a bond selected from the group consisting of $-NH-CO-O-X^6-$, $-NH-CO-NR^{21}-X^8-$, and $-NR^{22}-CO-NH-X^9-$ present per molecule. Here, each of $X^6$ to $X^9$ independently denotes an optionally substituted alkylene group. Each of $R^{21}$ and $R^{22}$ independently denotes a hydrogen atom or an alkyl group with 1 to 3 carbon atoms. The description above relating to $-(CR^{10}R^{11})m-$ can be referred for details regarding the alkylene group. The alkylene groups denoted by $X^6$ to $X^9$ are preferably optionally substituted alkyl groups with 1 to 12 carbon atoms. Linking group A is preferably linked to a ring structure, either directly or through a linking group. The description of an embodiment in which n denotes 1 and $R^1$ contains at least one ring structure has been given above. A linking group which links linking group A and a ring structure is preferably an optionally substituted alkylene group. The description of $-(CR^{10}R^{11})m-$ can be referred for such alkylene groups.

The compound denoted by formula 1 preferably contains at least one linking group A, preferably 1 to 4, per molecule.

(Molecular Weight of the Compound Denoted by Formula 1)

The molecular weight of the compound denoted by formula 1 is not specifically limited. However, from the perspective of compatibility with cellulose acetate, it is preferably less than or equal to 2,000, more preferably less than or equal to 1,500, further preferably less than or equal to 1,000, still further preferably less than or equal to 600, and even further preferably, less than or equal to 450. When the compound that is added to the cellulose acylate film is highly compatible with cellulose acylate, an increase in haze in the cellulose acylate film is inhibited. This is preferable for obtaining a cellulose acylate film with good transparency. Also from the perspective of the transparency of the cellulose acylate film, it is preferable to inhibit whitening and the like due to volatization of compounds added to the cellulose acylate film. For this reason, the molecular weight of the compound denoted by formula 1 is preferably greater than or equal to 230, more preferably greater than or equal to 250, and further preferably, greater than or equal to 300.

When the above compound is a polymer, the molecular weight refers to the weight average molecular weight. In the present, the average molecular weight refers to the average molecular weight as measured by gel permeation chromatography (GPC) and converted to a polystyrene conversion. The measurement conditions given below are an example of specific measurement conditions.

GPC device: HLC-8320 (made by Tosoh)
Columns: TSK gel Super HZM-H, TSK gel Super HZ4000, TSK gel Super HZ2000 employed in combination (made by Tosoh, 4.6 mm inner diameter (ID)×15.0 cm)
Eluent: Tetrahydrofuran (THF)

As set forth above, the compound denoted by formula 1 preferably contains a triazine ring, and more preferably contains a 1,3,5-triazine ring. The compound denoted by formula 2 below is an example of a compound comprising a 1,3,5-triazine ring.

<Compound Denoted by Formula 2>

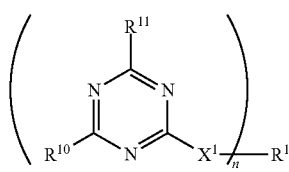

Formula 2

The compound denoted by formula 2 will be described in greater detail below.

In formula 2, each of $X^1$, $R^1$, and n are defined with the same definitions as in formula 1. The details are as set forth above in the description of formula 1.

In formula 2, each of $R^{10}$ and $R^{11}$ independently denotes a hydrogen atom or a substituent. The substituents given as examples in substituent group T above are examples of the substituents. Preferably, each of $R^{10}$ and $R^{11}$ independently denotes a substituent that is linked to the triazine ring through —$NR^{12}$— or —CO—, and $R^{12}$ denotes a hydrogen atom or an optionally substituted alkyl group. The description given above of the alkyl group optionally containing an alkylene group denoted by —$(CR^{10}R^{11})m$- can be referred with regard to the optionally substituted alkyl group. —$NR^{12}$— is preferably —NH—.

When n denotes 1 in formula 2, at least either $R^{10}$ or $R^{11}$ preferably denotes a substituent denoted by —$NR^{12}R^{13}$. It is more preferable for both $R^{10}$ and $R^{11}$ to denote substituents denoted by —$NR^{12}R^{13}$. In the present invention, each of $R^{12}$ and $R^{13}$ independently denotes a hydrogen atom or an optionally substituted alkyl group. The description given above of alkyl groups that can contain alkylene groups denoted by —$(CR^{10}R^{11})m$- can be referred, with regard to the optionally substituted alkyl group.

In the above embodiment, it is preferable for at least one member selected from the group consisting of $R^1$, $R^{10}$, and $R^{11}$ to contain a ring structure. A form of the ring structure that is contained in which n denotes 1 and at least one ring structure is contained in $R^1$ in the compound denoted by formula 1 has been described above. When a ring structure is contained in at least one member selected from the group consisting of $R^{10}$ and $R^{11}$, $R^{10}$ and $R^{11}$ preferably have ring structures on their ends, and preferably have ring structures that are directly linked or linked through linking groups to linking group A. The linking group linking group A and the ring structure is preferably an optionally substituted alkylene group. The description given above of alkylene groups denoted by —$(CR^{10}R^{11})m$- can be referred with regard to alkylene groups.

When n denotes an integer greater than or equal to 2 in formula 2, with n preferably denoting 2, the partial structure denoted by $R^1$ preferably contains at least one group selected from the group consisting of —NH— and —CO—. In this regard, the details are as given above when n denotes an integer greater than or equal to 2 in formula 1. As set forth above, it is preferable for two —NH— to be linked through a linking group. An optionally substituted alkylene group is preferable as the linking group. That is, when n denotes an integer that is greater than or equal to 2, with n preferably denoting 2, the partial structure denoted by $R^1$ preferably contains at least one —NH—$X^5$—NH—. In the present invention, $X^5$ is an optionally substituted alkylene group. The description given above for the alkylene group denoted by —$(CR^{10}R^{11})m$- can be referred.

When n denotes an integer that is greater than or equal to 2 in formula 2, with n preferably denoting 2, a ring structure is preferably contained in either $R^{10}$ or $R^{11}$. With regard to the ring structure, the details are as given for the embodiment in which at least one ring structure is contained in $R^1$. When a ring structure is contained in at least either $R^{10}$ or $R^{11}$, the ring structure is preferably present on the end of $R^{10}$ or $R^{11}$, and a ring structure linked to linking group A either directly or through a linking group, is preferably present. The linking group which links linking group A and the ring structure is preferably an optionally substituted alkylene group. The description given above for the alkylene group denoted by —$(CR^{10}R^{11})m$- can be referred with regard to the above alkylene group.

The following exemplary compounds are specific examples of the compound denoted by formula 1 set forth above. However, the present invention is not limited to these compounds.

TABLE 1

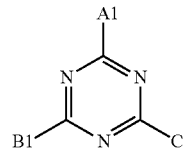

(A1, B1, and C in the above formula are indicated in the table below for the various exemplary compounds.)

| Compound No. | A1 | B1 | C |
|---|---|---|---|
| 1-1 | NMe | NMe | 1 |
| 1-2 | NMe | NMe | 2 |
| 1-3 | NMe | NMe | 3 |
| 1-4 | NMe | NMe | 4 |
| 1-5 | NMe | NMe | 5 |
| 1-6 | NMe | NMe | 6 |
| 1-7 | NMe | NMe | 7 |
| 1-8 | NMe | NMe | 8 |
| 1-9 | NMe | NMe | 9 |
| 1-10 | NMe | NMe | 10 |
| 1-11 | NMe | NMe | 11 |
| 1-12 | NMe | NMe | 12 |
| 1-13 | NMe | NMe | 13 |
| 1-14 | NMe | NMe | 14 |
| 1-15 | NMe | NMe | 15 |
| 1-16 | NMe | NMe | 16 |
| 1-17 | NMe | NMe | 17 |
| 1-18 | NMe | NMe | 18 |
| 1-19 | NMe | NMe | 19 |
| 1-20 | NMe | NMe | 20 |
| 1-21 | NMe | NMe | 21 |
| 1-22 | NMe | NMe | 36 |
| 1-23 | NMe | NMe | 37 |
| 1-24 | NMe | NMe | 38 |
| 1-25 | NEt | NEt | 1 |
| 1-26 | NEt | NEt | 2 |
| 1-27 | NEt | NEt | 3 |
| 1-28 | NEt | NEt | 4 |
| 1-29 | NEt | NEt | 5 |
| 1-30 | NEt | NEt | 6 |
| 1-31 | NEt | NEt | 7 |

TABLE 1-continued

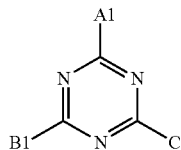

(A1, B1, and C in the above formula are indicated in the table below for the various exemplary compounds.)

| Compound No. | A1 | B1 | C |
|---|---|---|---|
| 1-32 | NEt | NEt | 8 |
| 1-33 | NEt | NEt | 9 |
| 1-34 | NEt | NEt | 10 |
| 1-35 | NEt | NEt | 11 |
| 1-36 | NEt | NEt | 12 |
| 1-37 | NEt | NEt | 13 |
| 1-38 | NEt | NEt | 14 |
| 1-39 | NEt | NEt | 15 |
| 1-40 | NEt | NEt | 16 |
| 1-41 | NEt | NEt | 17 |
| 1-42 | NEt | NEt | 18 |
| 1-43 | NEt | NEt | 19 |
| 1-44 | NEt | NEt | 20 |
| 1-45 | NEt | NEt | 21 |
| 1-46 | NDMe | NDMe | 1 |
| 1-47 | NDMe | NDMe | 2 |
| 1-48 | NDMe | NDMe | 3 |
| 1-49 | NDMe | NDMe | 4 |
| 1-50 | NDMe | NDMe | 5 |
| 1-51 | NDMe | NDMe | 6 |
| 1-52 | NDMe | NDMe | 7 |
| 1-53 | NDMe | NDMe | 8 |
| 1-54 | NDMe | NDMe | 9 |
| 1-55 | NDMe | NDMe | 10 |
| 1-56 | NDMe | NDMe | 11 |
| 1-57 | NDMe | NDMe | 12 |
| 1-58 | NDMe | NDMe | 13 |
| 1-59 | NDMe | NDMe | 14 |
| 1-60 | NDMe | NDMe | 15 |
| 1-61 | NDMe | NDMe | 16 |
| 1-62 | NDMe | NDMe | 17 |
| 1-63 | NDMe | NDMe | 18 |
| 1-64 | NDMe | NDMe | 19 |
| 1-65 | NDMe | NDMe | 20 |
| 1-66 | NDMe | NDMe | 21 |
| 1-67 | NBn | NBn | 1 |
| 1-68 | NBn | NBn | 2 |
| 1-69 | NBn | NBn | 3 |
| 1-70 | NBn | NBn | 4 |
| 1-71 | NBn | NBn | 5 |
| 1-72 | NBn | NBn | 6 |
| 1-73 | NBn | NBn | 7 |
| 1-74 | NBn | NBn | 8 |
| 1-75 | NBn | NBn | 9 |
| 1-76 | NBn | NBn | 10 |
| 1-77 | NBn | NBn | 11 |
| 1-78 | NBn | NBn | 12 |
| 1-79 | NBn | NBn | 13 |
| 1-80 | NBn | NBn | 14 |
| 1-81 | NBn | NBn | 15 |
| 1-82 | NBn | NBn | 16 |
| 1-83 | NBn | NBn | 17 |
| 1-84 | NBn | NBn | 18 |
| 1-85 | NBn | NBn | 19 |
| 1-86 | NBn | NBn | 20 |
| 1-87 | NBn | NBn | 21 |
| 2-1 | OMe | OMe | 1 |
| 2-2 | OMe | OMe | 2 |
| 2-3 | OMe | OMe | 3 |
| 2-4 | OMe | OMe | 4 |
| 2-5 | OMe | OMe | 5 |
| 2-6 | OMe | OMe | 6 |
| 2-7 | OMe | OMe | 7 |
| 2-8 | OMe | OMe | 8 |
| 2-9 | OMe | OMe | 9 |
| 2-10 | OMe | OMe | 10 |
| 2-11 | OMe | OMe | 11 |

TABLE 1-continued

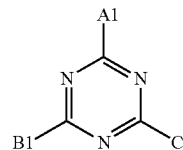

(A1, B1, and C in the above formula are indicated in the table below for the various exemplary compounds.)

| Compound No. | A1 | B1 | C |
|---|---|---|---|
| 2-12 | OMe | OMe | 12 |
| 2-13 | OMe | OMe | 13 |
| 2-14 | OMe | OMe | 14 |
| 2-15 | OMe | OMe | 15 |
| 2-16 | OMe | OMe | 16 |
| 2-17 | OMe | OMe | 17 |
| 2-18 | OMe | OMe | 18 |
| 2-19 | OMe | OMe | 19 |
| 2-20 | OMe | OMe | 20 |
| 2-21 | OMe | OMe | 21 |
| 2-22 | OEt | OEt | 1 |
| 2-23 | OEt | OEt | 2 |
| 2-24 | OEt | OEt | 3 |
| 2-25 | OEt | OEt | 4 |
| 2-26 | OEt | OEt | 5 |
| 2-27 | OEt | OEt | 6 |
| 2-28 | OEt | OEt | 7 |
| 2-29 | OEt | OEt | 8 |
| 2-30 | OEt | OEt | 9 |
| 2-31 | OEt | OEt | 10 |
| 2-32 | OEt | OEt | 11 |
| 2-33 | OEt | OEt | 12 |
| 2-34 | OEt | OEt | 13 |
| 2-35 | OEt | OEt | 14 |
| 2-36 | OEt | OEt | 15 |
| 2-37 | OEt | OEt | 16 |
| 2-38 | OEt | OEt | 17 |
| 2-39 | OEt | OEt | 18 |
| 2-40 | OEt | OEt | 19 |
| 2-41 | OEt | OEt | 20 |
| 2-42 | OEt | OEt | 21 |
| 3-1 | NMe | OMe | 1 |
| 3-2 | NMe | OMe | 2 |
| 3-3 | NMe | OMe | 3 |
| 3-4 | NMe | OMe | 4 |
| 3-5 | NMe | OMe | 5 |
| 3-6 | NMe | OMe | 6 |
| 3-7 | NMe | OMe | 7 |
| 3-8 | NMe | OMe | 8 |
| 3-9 | NMe | OMe | 9 |
| 3-10 | NMe | OMe | 10 |
| 3-11 | NMe | OMe | 11 |
| 3-12 | NMe | OMe | 12 |
| 3-13 | NMe | OMe | 13 |
| 3-14 | NMe | OMe | 14 |
| 3-15 | NMe | OMe | 15 |
| 3-16 | NMe | OMe | 16 |
| 3-17 | NMe | OMe | 17 |
| 3-18 | NMe | OMe | 18 |
| 3-19 | NMe | OMe | 19 |
| 3-20 | NMe | OMe | 20 |
| 3-21 | NMe | OMe | 21 |
| 3-22 | NMe | OMe | 36 |
| 3-23 | NMe | OMe | 37 |
| 3-24 | NMe | OMe | 38 |
| 3-25 | NEt | OMe | 1 |
| 3-26 | NEt | OMe | 2 |
| 3-27 | NEt | OMe | 3 |
| 3-28 | NEt | OMe | 4 |
| 3-29 | NEt | OMe | 5 |
| 3-30 | NEt | OMe | 6 |
| 3-31 | NEt | OMe | 7 |
| 3-32 | NEt | OMe | 8 |
| 3-33 | NEt | OMe | 9 |
| 3-34 | NEt | OMe | 10 |
| 3-35 | NEt | OMe | 11 |
| 3-36 | NEt | OMe | 12 |

TABLE 1-continued

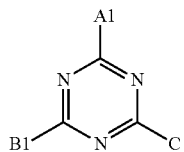

(A1, B1, and C in the above formula are indicated in the table below for the various exemplary compounds.)

| Compound No. | A1 | B1 | C |
|---|---|---|---|
| 3-37 | NEt | OMe | 13 |
| 3-38 | NEt | OMe | 14 |
| 3-39 | NEt | OMe | 15 |
| 3-40 | NEt | OMe | 16 |
| 6-1 | 1 | 1 | 1 |
| 6-2 | 2 | 2 | 2 |
| 6-3 | 3 | 3 | 3 |
| 6-4 | 4 | 4 | 4 |
| 6-5 | 5 | 5 | 5 |
| 6-6 | 6 | 6 | 6 |
| 6-7 | 7 | 7 | 7 |
| 6-8 | 8 | 8 | 8 |
| 6-9 | 9 | 9 | 9 |
| 6-10 | 10 | 10 | 10 |
| 6-11 | 11 | 11 | 11 |
| 6-12 | 12 | 12 | 12 |
| 6-13 | 13 | 13 | 13 |
| 6-14 | 14 | 14 | 14 |
| 6-15 | 15 | 15 | 15 |
| 6-16 | 16 | 16 | 16 |
| 6-17 | 17 | 17 | 17 |
| 6-18 | 18 | 18 | 18 |
| 6-19 | 19 | 19 | 19 |
| 6-20 | 20 | 20 | 20 |
| 6-21 | 21 | 21 | 21 |
| 7-1 | 1 | 1 | NMe |
| 7-2 | 2 | 2 | NMe |
| 7-3 | 3 | 3 | NMe |
| 7-4 | 4 | 4 | NMe |
| 7-5 | 5 | 5 | NMe |
| 7-6 | 6 | 6 | NMe |
| 7-7 | 7 | 7 | NMe |
| 7-8 | 8 | 8 | NMe |
| 7-9 | 9 | 9 | NMe |
| 7-10 | 10 | 10 | NMe |
| 7-11 | 11 | 11 | NMe |
| 7-12 | 12 | 12 | NMe |
| 7-13 | 13 | 13 | NMe |
| 7-14 | 14 | 14 | NMe |
| 7-15 | 15 | 15 | NMe |
| 7-16 | 16 | 16 | NMe |
| 7-17 | 17 | 17 | NMe |
| 7-18 | 18 | 18 | NMe |
| 7-19 | 19 | 19 | NMe |
| 7-20 | 20 | 20 | NMe |
| 7-21 | 21 | 21 | NMe |
| 7-22 | 1 | 1 | OMe |
| 7-23 | 2 | 2 | OMe |
| 7-24 | 3 | 3 | OMe |
| 7-25 | 4 | 4 | OMe |
| 7-26 | 5 | 5 | OMe |
| 7-27 | 6 | 6 | OMe |
| 7-28 | 7 | 7 | OMe |
| 7-29 | 8 | 8 | OMe |
| 7-30 | 9 | 9 | OMe |
| 7-31 | 10 | 10 | OMe |

TABLE 2

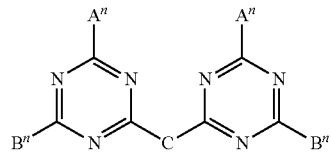

(One of the two of $A^n$ contained in the above formula is denoted as A1 and the other as A2. One of the two of $B^n$ is denoted as B1 and the other as B2. For the various exemplary compounds, A1, A2, B1, B2, and C in the above formula above are given in the table below.)

| Compound No. | A1 | A2 | B1 | B2 | C |
|---|---|---|---|---|---|
| 4-1 | NMe | NMe | NMe | NMe | 22 |
| 4-2 | NMe | NMe | NMe | NMe | 23 |
| 4-3 | NMe | NMe | NMe | NMe | 24 |
| 4-4 | NMe | NMe | NMe | NMe | 25 |
| 4-5 | NMe | NMe | NMe | NMe | 26 |
| 4-6 | NMe | NMe | NMe | NMe | 27 |
| 4-7 | NMe | NMe | NMe | NMe | 28 |
| 4-8 | NMe | NMe | NMe | NMe | 29 |
| 4-9 | NMe | NMe | NMe | NMe | 30 |
| 4-10 | NMe | NMe | NMe | NMe | 31 |
| 4-11 | NMe | NMe | NMe | NMe | 32 |
| 4-12 | NMe | NMe | NMe | NMe | 33 |
| 4-13 | NMe | NMe | NMe | NMe | 34 |
| 4-14 | NMe | NMe | NMe | NMe | 35 |
| 4-15 | OMe | OMe | OMe | OMe | 28 |
| 4-16 | OMe | OMe | OMe | OMe | 29 |
| 4-17 | OMe | OMe | OMe | OMe | 30 |
| 4-18 | OMe | OMe | OMe | OMe | 31 |
| 4-19 | OMe | OMe | OMe | OMe | 32 |
| 4-20 | OMe | OMe | OMe | OMe | 33 |
| 4-21 | NMe | NMe | OMe | OMe | 22 |
| 4-22 | NMe | NMe | OMe | OMe | 23 |
| 4-23 | NMe | NMe | OMe | OMe | 24 |
| 4-24 | NMe | NMe | OMe | OMe | 25 |
| 4-25 | NMe | NMe | OMe | OMe | 26 |
| 4-26 | NMe | NMe | OMe | OMe | 27 |
| 4-27 | NMe | NMe | OMe | OMe | 28 |
| 4-28 | NMe | NMe | OMe | OMe | 29 |
| 4-29 | NMe | NMe | OMe | OMe | 30 |
| 4-30 | NMe | NMe | OMe | OMe | 31 |
| 4-31 | NMe | NMe | OMe | OMe | 32 |
| 4-32 | NMe | NMe | OMe | OMe | 33 |
| 4-33 | NMe | NMe | OMe | OMe | 34 |
| 4-34 | NMe | NMe | OMe | OMe | 35 |
| 5-1 | 1 | 1 | 1 | 1 | ED |
| 5-2 | 2 | 2 | 2 | 2 | ED |
| 5-3 | 3 | 3 | 3 | 3 | ED |
| 5-4 | 4 | 4 | 4 | 4 | ED |
| 5-5 | 5 | 5 | 5 | 5 | ED |
| 5-6 | 6 | 6 | 6 | 6 | ED |
| 5-7 | 7 | 7 | 7 | 7 | ED |
| 5-8 | 8 | 8 | 8 | 8 | ED |
| 5-9 | 9 | 9 | 9 | 9 | ED |
| 5-10 | 10 | 10 | 10 | 10 | ED |
| 5-11 | 11 | 11 | 11 | 11 | ED |
| 5-12 | 12 | 12 | 12 | 12 | ED |
| 5-13 | 13 | 13 | 13 | 13 | ED |
| 5-14 | 14 | 14 | 14 | 14 | ED |
| 5-15 | 15 | 15 | 15 | 15 | ED |
| 5-16 | 16 | 16 | 16 | 16 | ED |
| 5-17 | 17 | 17 | 17 | 17 | ED |
| 5-18 | 18 | 18 | 18 | 18 | ED |
| 5-19 | 19 | 19 | 19 | 19 | ED |
| 5-20 | 20 | 20 | 20 | 20 | ED |
| 5-21 | 21 | 21 | 21 | 21 | ED |

In Tables 1 and 2, the partial structures contained as portions A1, A2, B1, B2, and C are as given below.

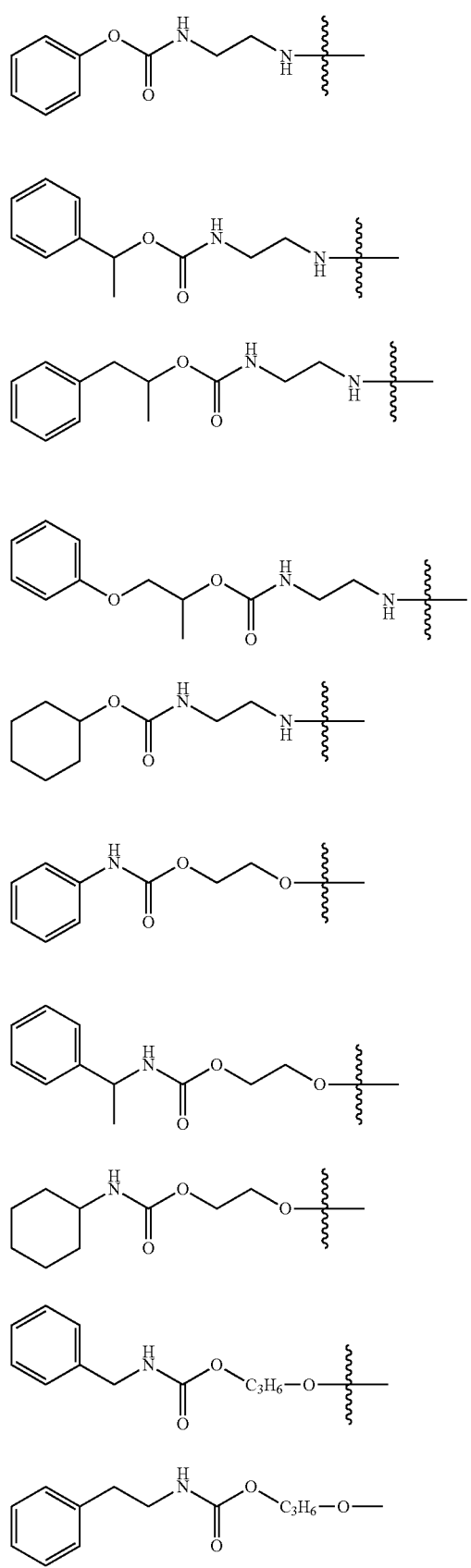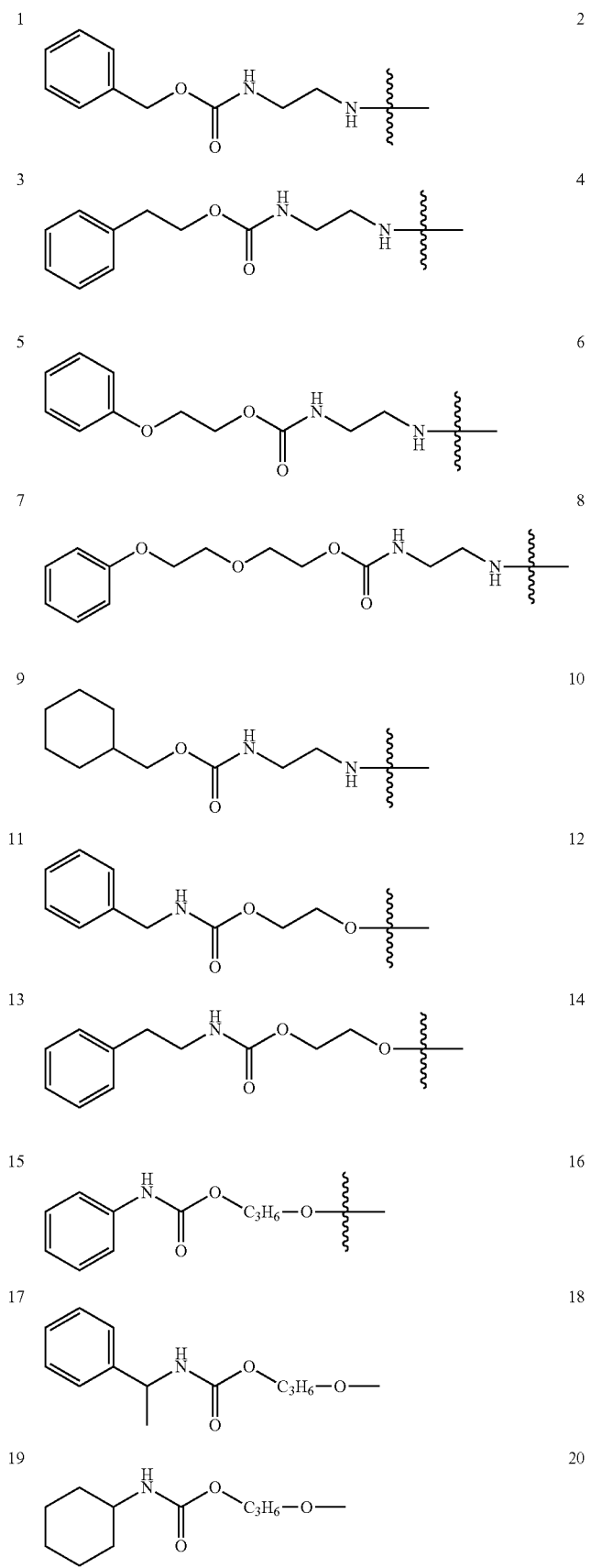

-continued
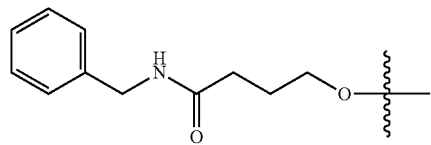
21
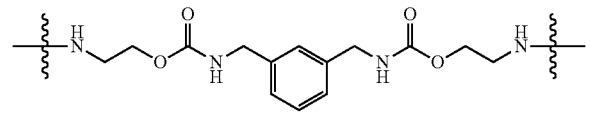
22
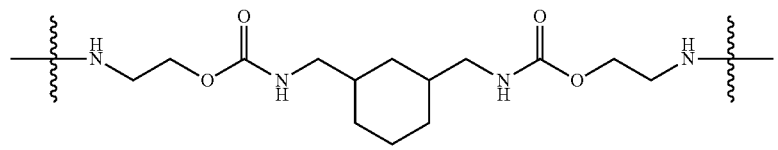
23
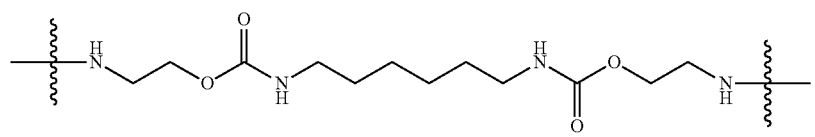
24
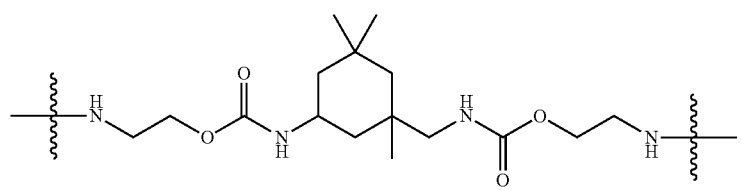
25
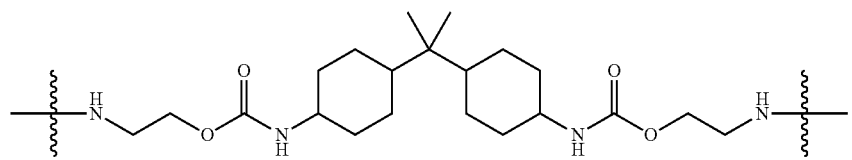
26
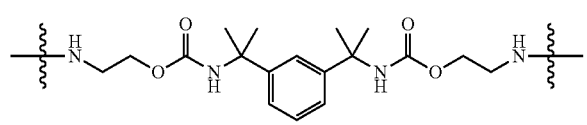
27
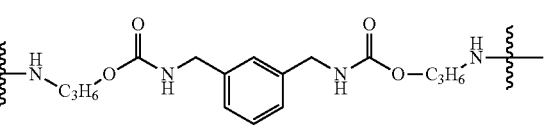
28
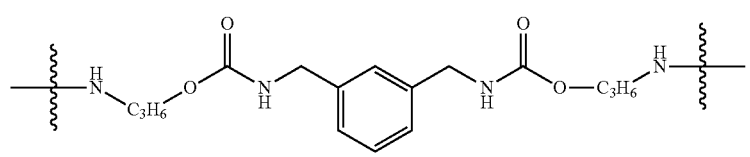
29
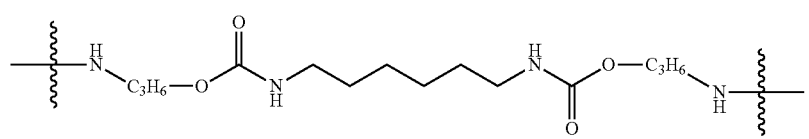
30
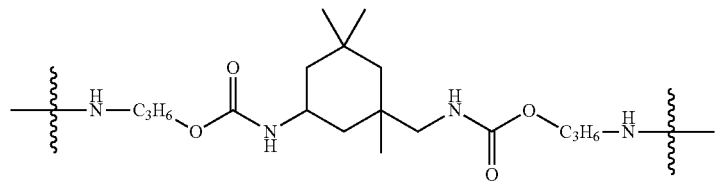
31
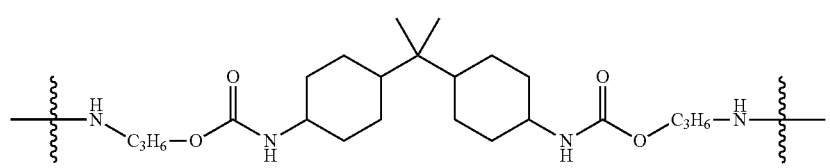
32

-continued
33
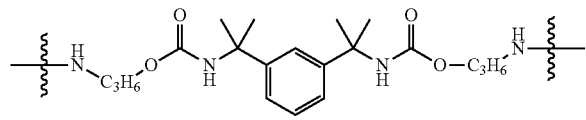
34
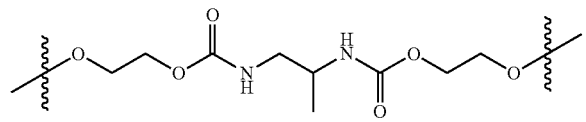
35
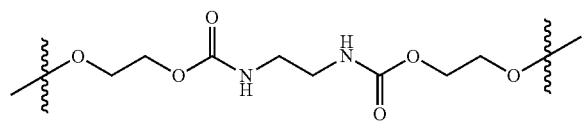
36
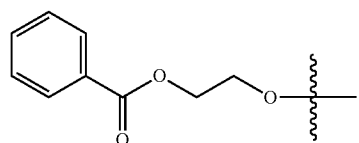
37
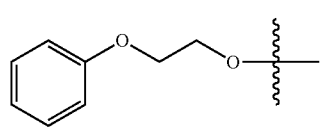
38
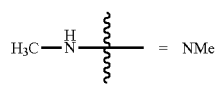
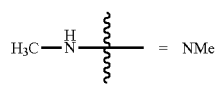 = NMe
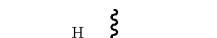 = NEt
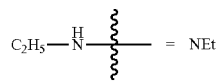 = NDMe
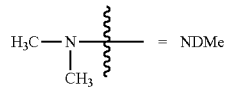 = NBn
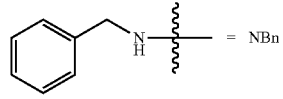 = OMe
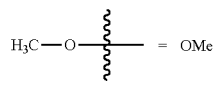 = OEt
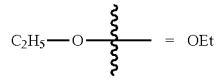 = ED
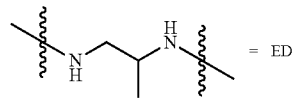 = PD
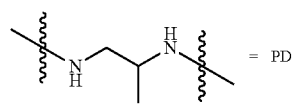 = o-CD
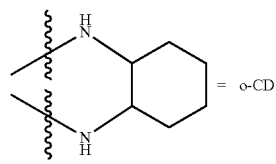 = XD The following compounds are examples of the compound denoted by formula 1.

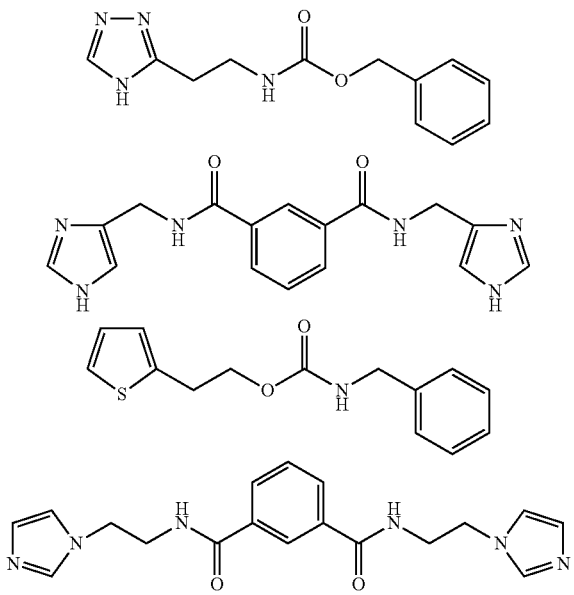

The compound denoted by formula 1 can be synthesized by known methods, such as the methods described in J. Org. Chem., 2011, p 1804 to 1813 and J. Am. Chem. Soc., 2001, 123, p 8914 to 8922, or by referencing these methods. The contents of the above literatures are expressly incorporated herein by reference in their entirety.

(Content)

The content of the compound denoted by formula 1 in the cellulose acylate film is not specifically limited. It is preferably 1.0 to 50.0 weight parts, more preferably 2.0 to 30.0 weight parts, further preferably 2.0 to 20.0 weight parts, and still further preferably, 4.0 to 15.0 weight parts, per 100.0 weight parts of cellulose acylate. Two or more compounds denoted by formula 1 and having different structures can be added to the cellulose acylate film. When two or more compounds are added, the preferable range of the content remains as set forth above.

<Cellulose Acylate>

Any of the known cellulose acylates that are used to manufacture cellulose acylate films can be employed without limitation. The degree of substitution of cellulose acylate means the ratio in which the three hydroxyl groups that are present in the structural unit ((β) 1,4-glycoside-bonded glucose) of cellulose are acylated. The degree of substitution (degree of acylation) can be calculated by measuring the quantity of bonded fatty acids per structural unit weight of cellulose. In the present invention, a cellulose material that has been deuterium substituted can be dissolved in a solvent such as dimethylsulfoxide, a $^{13}$C-NMR spectrum can be measured, and the degree of substitution of the cellulose material can be calculated from the peak strength ratio of the carbonyl carbon in the acyl group. Once the residual hydroxyl group of cellulose acylate has been replaced with a different acyl group from the acyl group that is present in cellulose acylate itself, the degree of substitution can be obtained by $^{13}$C-NMR measurement. Details regarding the measurement method have been described by Tezuka et al. (Carbohydrate Res., 273 (1995) 83-91), which is expressly incorporated herein by reference in its entirety.

The degree of substitution of cellulose acetate is preferably greater than or equal to 1.5 and less than or equal to 3.0, more preferably from 2.00 to 2.97, further preferably greater than or equal to 2.50 and less than 2.97, and still further preferably, from 2.70 to 2.95.

The degree of substitution of cellulose acetate in which just acetyl groups have been employed as the acyl groups of cellulose acylate is preferably greater than or equal to 2.0 and less than or equal to 3.0, more preferably from 2.3 to 3.0, further preferably from 2.60 to 3.0, still further preferably from 2.6 to 2.97, and yet further preferably, from 2.70 to 2.95 from the perspective of achieving considerable improvement in the scratch resistance of the film based on the above compound.

Acetyl groups, propionyl groups, and butyryl groups are preferable, and acetyl groups are more preferable, as the acyl group of cellulose acylate.

Mixed fatty esters having two or more types of acyl groups can also be preferably used as cellulose acylate in the present invention. In this case, acetyl groups and acyl groups having 3 or 4 carbon atoms are preferable as the acyl groups. When employing mixed fatty esters, the degree of substitution when acetyl groups are contained as acyl groups is preferably less than 2.5, more preferably less than 1.9. Additionally, the degree of substitution when containing acyl groups with 3 or 4 carbon atoms is preferably 0.1 to 1.5, more preferably 0.2 to 1.2, and further preferably, 0.5 to 1.1.

Two types of cellulose acylate that differ in terms of either, or both, types of substituents and degree of substitution can be employed in combination and mixed for use in the present invention. It is also possible to form a film comprising multiple layers comprised of different cellulose acylates by the co-casting method or the like, described further below.

The mixed acid ester having fatty acid acyl groups and substituted or unsubstituted aromatic acyl groups that is described in JP-A-2008-20896, paragraphs 0023 to 0038, is also preferably employed in the present invention. The content of the above publication is expressly incorporated herein by reference in its entirety.

The cellulose acylate preferably has a weight average degree of polymerization of 250 to 800, more preferably a weight average degree of polymerization of 300 to 600. The cellulose acylate employed in the present invention preferably has a number average molecular weight of 40,000 to 230,000, more preferably has a number average molecular weight of 60,000 to 230,000, and optimally, has a number average molecular weight of 75,000 to 200,000.

The cellulose acylate can be synthesized using an acylating agent in the form of an acid anhydride or acid chloride. When the acylating agent is an acid anhydride, a reaction solvent in the form of an organic acid (such as acetic acid) or methylene chloride is employed. A protonic catalyst such as sulfuric acid can be employed as a catalyst. When the acylating agent is acid chloride, a basic compound can be employed as catalyst. In the most common industrial synthesis method, cellulose acylate is synthesized by esterifying cellulose with mixed organic acid components containing organic acids corresponding to the acetyl group and other acyl groups (acetic acid, propionic acid, butyric acid) or their acid anhydrides (acetic anhydride, propionic anhydride, butyric anhydride).

In the above method, cellulose such as cotton linters or wood pulp is subjected to an activation treatment with an organic acid such as acetic acid and then, in the presence of a sulfuric acid catalyst, a mixed liquid of organic acid components such as those set forth above is often used for esterification. The organic acid anhydride component is generally employed in an excess quantity relative to the quantity of hydroxyl groups present in the cellulose. In this esterification treatment, a cellulose main chain ((β) 1,4-glycoside bond) hydrolysis reaction (depolymerization reaction) takes place in addition to the esterification reaction. As the main chain hydrolysis reaction advances, the degree of polymerization of the cellulose acetate decreases, and the physical properties of the cellulose acylate film that is manufactured deteriorate. Thus, reaction conditions such as the reaction temperature are preferably determined by taking into account the degree of polymerization and the molecular weight of the cellulose acetate to be obtained.

<Additives Optionally Contained in the Cellulose Acylate Film>

Additives can be contained in the above cellulose acylate film in addition to cellulose acetate and the compound denoted by formula 1. Examples of additives are known plasticizers, organic acids, pigments, polymers, retardation adjusting agents, UV absorbing agents, oxidation inhibitors, and matting agents. The description given in JP-A-2012-155287, paragraphs 0062 to 0097, the contents of which are hereby incorporated in their entirety by reference, can be referred, in this regard. The combined contents of these additives are preferably less than or equal to 50 weight %, more preferably less than or equal to 30 weight %, of the cellulose acetate.

<Method of Manufacturing the Cellulose Acylate Film>

The method of manufacturing the above cellulose acylate film is not specifically limited. The manufacturing is preferably done by the melt film-forming method or solvent casting method, and more preferably done by the solvent casting method. For examples of manufacturing cellulose acylate films by the solvent casting method, each specification of U.S. Pat. Nos. 2,336,310, 2,367,603, 2,492,078, 2,492,977, 2,492,978, 2,607,704, 2,739,069, and 2,739,070; UK patents 640,731 and 736,892; JP-B-Showa Nos. 45-4554 and 49-5614; JP-A-Nos. Showa 60-176834, 60-203430, and 62-115035, can be referred. Cellulose acylate films can also be subjected to stretching treatment. JP-A-Showa No. Showa 62-115035 and Heisei Nos. 4-152125, 4-284211, 4-298310, 11-48271, and the like, can be referred. The contents of the above publications are expressly incorporated herein by reference in their entirety.

(Casting Methods)

Solution casting methods exist in the form of the method of uniformly extruding a prepared dope onto a metal support member through a pressure die; the method based on a doctor blade consisting of adjusting the film thickness of a dope that has been cast onto a metal support member with a blade; the method based on a reverse roll coater of adjustment with a roll rotating in reverse; and the like. The method based in a pressure die is preferred. Examples of a pressure die include a coat hanger type and a T-die type. Any of them is preferably employed. In addition to the examples of methods given here, various conventionally known methods of casting films with cellulose acylate solutions can be applied. The various conditions can be set by taking into account differences in the boiling point and the like of the solvent employed.

Co-Casting

Accumulation flow casting methods such as the co-casting method, sequential casting method, and coating method are preferably employed to form cellulose acylate films. Use of the simultaneous co-casting method is particularly preferable from the perspective of stable manufacturing and reduced production costs.

In manufacturing by the co-casting and sequential casting methods, a cellulose acylate solution (dope) is first prepared for each layer. The co-casting method (simultaneous lamination casting) is a casting method in which the casting dopes of the individual layers (three layers, or even more) are simultaneously extruded through separate slits with a casting gisa to simultaneously cast all the layers on a casting support (band or drum). At a suitable time, the film is separated from the support and dried to mold a film. Using a co-casting gisa, it is possible to simultaneously extrude and cast the three layers of outer layer dopes and a core layer dope on a casting support.

The sequential casting method is a casting method in which a first layer casting dope is first extruded and cast through a casting gisa onto a casting support and, with or without drying, the second layer casting dope is extruded and cast with the casting gisa over the first layer. The dopes of the third, and subsequent layers are sequentially cast and laminated by this procedure as needed. At a suitable time, the film is separated from the support and dried to form a cellulose acylate film. The coating method is a method generally in which a core layer film is formed into a film form by a solution film-forming method, the coating liquid that will be coated on the outer layer is prepared, and a suitable coating apparatus is employed to coat and dry the coating liquid on each of, or simultaneously on both of surfaces of the core layer, thereby molding a cellulose acylate film of laminate structure.

A cellulose acylate film exhibiting high scratch resistance and low moisture permeability can be obtained by incorporating the above compounds into any one or more of these layers, or all of the layers.

(Stretch Processing)

A step of stretching the film is preferably included in the method of manufacturing the cellulose acylate film. The direction in which the cellulose acylate film is stretched is preferably either the direction of conveyance of the cellulose acylate film (MD direction (Machine Direction)) or the direction perpendicular to the direction of conveyance (TD direction (Transverse Direction)). Making it the direction perpendicular to the direction of conveyance of the cellulose acylate film (TD direction) is preferred from the perspective of subsequent polarizing plate processing using the cellulose acylate film.

TD direction stretching methods are described in, for example, the publications of JP-A-Showa No. 62-115035 and Heisei Nos. 4-152125, 4-284211, 4-298310, and 11-48271. The contents of the above publications are expressly incorporated herein by reference in their entirety. When conducting stretching in the MD direction, for example, the speed of the conveyor rollers of the cellulose acylate film is adjusted so that the winding rate of the cellulose acylate film is greater than the peeling rate of the cellulose acylate film, thereby stretching the cellulose acylate film. When conducting stretching in the TD direction, the cellulose acylate film is conveyed while holding the width with a tenter, and gradually widening the width of the tenter to stretch the cellulose acylate film After drying the cellulose acylate film, stretching can be conducted with a stretching apparatus (preferably uniaxial stretching with a Long stretching apparatus).

When employing a cellulose acylate film as a protective film on a polarizer (also referred to as a polarizing film protective film), to inhibit leakage of light when viewing the polarizing plate diagonally, it is necessary to dispose the transmission axis of the polarizer and the in-plane slow axis of the cellulose acylate film in parallel. Since the transmission axis of a polarizer in the form of a continuously manufactured roll film is generally parallel to the width direction of the roll film, the continuously adhesion of a protective film comprised of a cellulose acylate film in the form of a roll film on the polarizer in the form of a roll film requires that the in-plane slow axis of the protective film in the form of a roll film be parallel to the width direction of the cellulose acylate film. Accordingly, greater stretching is preferable in the TD direction. The stretch processing can be conducted during the film manufacturing process, or the film can be manufactured and the wound raw sheet can be stretch processed.

The stretching in the TD direction is preferably 5 to 100%, preferably 5 to 80%, and more preferably, 5 to 40%. The term "unstretched" means stretched by 0%. The stretch processing can be conducted during the film manufacturing process, or the film can be manufactured and the wound raw sheet can be stretch processed. In the former case, stretching can be conducted with a quantity of residual solvent present. Stretching is preferably conducted so that the quantity of residual solvent, which is equal to (weight of residual volatized fraction/weight of film after heat treatment)× 100%, is 0.05 to 50%. It is preferable to conduct 5 to 80% stretching with the quantity of residual solvent being 0.05 to 5%.

The scratch resistance of the film can be further increased by subjecting the cellulose acylate film containing the compound denoted by formula 1 above to a stretching treatment.

<Physical Properties of the Cellulose Acylate Film>
(Knoop Hardness)

Good scratch resistance can be imparted to the above cellulose acylate film by containing the compound denoted by formula 1. Surface hardness is an example of one index of scratch resistance. In Examples set forth further below, the Knoop hardness is employed. In the present invention, the Knoop hardness is a value obtained by the following method in accordance with the method of JIS Z 2251, which is expressly incorporated herein by reference in its entirety. JIS Z 2251 is a Japanese Industrial Standard created based on ISO4545.

The surface of a sample fixed on a glass substrate is measured under conditions of a loading period of 5 seconds, a creep period of 5 seconds, an unloading period of 10 seconds, and a maximum load of 50 mN with a Knoop indenter disposed with the minor axis of the indenter oriented in parallel to the direction of conveyance (longitudinal direction) during manufacturing of cellulose acylate film in accordance with JIS Z 2251 employing a Fischerscope H100Vp model hardness meter made by Fischer Instruments (Ltd.). The hardness is calculated from the relation between the maximum load and the contact area of the indenter and sample obtained from the depth of indentation, and the average of the values obtained in five spots is calculated. These operations are conducted on 10 polymer films manufactured under the same conditions, and the arithmetic average of the values obtained is adopted as the Knoop hardness.

Unless specifically stated otherwise, the Knoop hardness in the present invention refers to the Knoop hardness as obtained by the above method.

The above cellulose acylate film preferably exhibits a Knoop hardness of greater than or equal to 210 N/mm$^2$, and more preferably exhibits a Knoop hardness of greater than or equal to 220 N/mm$^2$, on at least one surface, preferably both surfaces, thereof. By way of example, the Knoop hardness is less than or equal to about 315 N/mm$^2$, and can be less than or equal to about 300 N/mm$^2$. A high value is preferable from the perspective of increasing the scratch resistance, so no specific upper limit is set.

(Moisture Permeability)

The above cellulose acylate film can be imparted with low moisture permeability by containing the compound denoted by formula 1. The degree of moisture permeability can be employed as an index of the moisture permeability of the cellulose acylate film. The degree of moisture permeability of the above cellulose acylate film obtained by measuring the weight of water vapor passing through a sample over 24 hours in an atmosphere of 90% relative humidity at a temperature of 40° C. in accordance with the degree of moisture permeability test (cup method) of JIS Z 0208 is preferably less than or equal to 1,480 g/m$^2$·day, more preferably less than or equal to 1,470 g/m$^2$·day, and further preferably less than or equal to 1,460 g/m$^2$·day. The degree of moisture permeability is, for example, greater than or equal to 1,200 g/m$^2$·day. However, the lower the better, so no lower limit is specifically set.

(Other Physical Properties)
Water Content:

The water content of the cellulose acylate film can be evaluated by measuring the equilibrium water content at a certain temperature and humidity. The equilibrium water content is determined by placing the sample for 24 hours at the above temperature and humidity, measuring the quantity of water in the sample that has reached equilibrium by the Karl Fischer method, and dividing the quantity of water (g) by the weight of the sample (g).

The water content of the cellulose acylate film at 25° C. and 80% relative humidity is preferably less than or equal to 5 weight %, more preferably less than or equal to 4 weight %, and further preferably, less than 3 weight %.

Keeping the water content of the cellulose acylate film, constituting a liquid crystal display device as a polarizing plate protective film, low is preferable. It can prevent image quality of the liquid crystal display device from deteriorating due to conditions of high temperature and high moisture. The lower limit of the water content is, for example, greater than or equal to 0.1 weight %, but is not specifically set.

Haze:

The cellulose acylate film preferably has haze measure by the following method of less than or equal to 1%, more preferably less than or equal to 0.7%, and further preferably, less than or equal to 0.5%. Keeping the haze to less than or equal to the upper limit set forth above affords the advantages of increasing the transparency of the cellulose acylate film and rendering it more desirable to use as a polarizing plate and constituting members of liquid crystal display devices. The lower limit of haze is, for example, greater than or equal to 0.001%, but not specifically limited.

The haze is measured for a 40 mm×80 mm sample of cellulose acylate film in accordance with JIS K7136 with a hazemeter (HGM-2DP, made by Suga Test Instruments Co., Ltd.) in an environment of 25° C. and 60% relative humidity.

The Film Thickness:

The film thickness of the cellulose acylate film can be suitably determined based on the application. For example, it can be 5 to 100 μm. Greater than or equal to 5 μm is preferable to enhance handling properties when fabricating a web-like film. Less than or equal to 100 μm facilitates response to changes in humidity and the maintenance of optical characteristics. The thickness of the cellulose acylate film is preferably 8 to 80 μm, further preferably 10 to 70 μm.

When the cellulose acylate film has a multilayer structure comprised of three or more layers, the thickness of the core layer is preferably 3 to 70 µm, more preferably 5 to 60 µm. When the cellulose acylate film has a three-layer structure, the thickness of skin layer A and skin layer B is preferably 0.5 to 20 µm, more preferably 0.5 to 10 µm, and further preferably, 0.5 to 3 µm, for each. The core layer refers to the middle portion in a three-layer structure, and the skin layers A and B refer to the outermost layers in a three-layer structure.

Width:

The width of the cellulose acetylate film is preferably 700 to 3,000 mm, more preferably 1,000 to 2,800 mm, and further preferably, 1,300 to 2,500 mm.

(Saponification)

The above cellulose acylate film can be subjected to an alkali saponification treatment to impart adhesion to the material of a polarizer such as polyvinyl alcohol, permitting use as the protective film of a polarizing plate.

The method described in JP-A-No. 2007-86748, paragraphs 0211 and 0212, can be employed as the saponification method. The content of the above publication is expressly incorporated herein by reference in its entirety.

For example, the alkali saponification treatment of the cellulose acylate film is preferably conducted in a cycle of immersing the film surface in an alkali solution followed by neutralization with an acidic solution, washing with water, and drying. Examples of the alkali solution are a potassium hydroxide solution and sodium hydroxide solution. The concentration of the hydroxide ions preferably falls within a range of 0.1 to 5.0 mol/L, more preferably within a range of 0.5 to 4.0 mol/L. The temperature of the alkali solution preferably falls within a range of room temperature to 90° C., more preferably within a range of 40 to 70° C.

Alternatively, adhesion-enhancing processing such as is described in JP-A-Heisei Nos. 6-94915 and 6-118232, which are expressly incorporated herein by reference in their entirety, can be conducted instead of an alkali saponification treatment.

Polarizing Plate (Structure of the Polarizing Plate)

The polarizing plate of an aspect of the present invention comprises the above cellulose acylate film and a polarizer.

In one embodiment, the polarizing plate contains a polarizer and two polarizing plate protective films that protect the two surfaces of the polarizer, it being possible for the above cellulose acylate film to be present as at least one of the polarizing plate protective films.

Further, a liquid crystal display device is normally configured with a liquid crystal cell positioned between the polarizing plate on the viewer-side and the polarizing plate on the backlight-side. In the viewer-side polarizing plate and backlight-side polarizing plate, the polarizing plate protective film positioned between the polarizing plate and the liquid crystal cell is called the inner protective film and the protective film positioned on the opposite side from the inner side is called the outer protective film. The above cellulose acylate film can thus be used as a protective film on the inner side and outer side of the viewer-side polarizing plate and on the inner side and outer side of the backlight-side polarizing plate.

Other film member(s) can be employed as polarizing plate protective films along with the above cellulose acylate film. The other film members that are employed in such cases are not specifically limited. The various film members that are commonly employed as polarizing plate protective films can be employed.

For example, a polyvinyl alcohol film that has been immersed in an iodine solution and stretched can be employed as a polarizer. When employing a polarizer obtained by immersing a polyvinyl alcohol film in an iodine solution and stretching it, the saponification-treated side of the cellulose acylate film can be directly bonded to at least one side of the polarizer with adhesive. The adhesive employed can be an aqueous solution of a polyvinyl alcohol or polyvinyl acetal (such as polyvinyl butyral), or the latex of a vinyl polymer (such as polybutyl acrylate). The aqueous solution of a fully saponified polyvinyl alcohol is a preferred adhesive.

When a polarizing plate protective film is optically anisotropic, the polarizing plate protective film is preferably laminated to the polarizer with the transmission axis of the polarizer essentially parallel, perpendicular, or at 45° to the slow axis of the polarizing plate protective film. The slow axis can be measured by various known methods. For example, it can be measured with a birefringence meter (Kobra DH, made by Oji Scientific Instruments (Ltd.)).

In the present invention, the term "essentially parallel, perpendicular, or at 45°" means that the misalignment between the direction of the main refractive index nx of the polarizing plate protective film and the direction of the transmission axis of the polarizing plate is less than or equal to 5°. This misalignment is preferably less than or equal to 1°, more preferably less than or equal to 0.5°. A misalignment of less than or equal to 1° is preferable in that light leakage tends not to occur and the degree of polarization performance of the polarizing plate in crossed-nicols tends not to decrease.

<Multifunctionalization of Polarizing Plate>

To the extent that no departure is made from the spirit of the present invention, the above polarizing plate is preferably employed as a functionalized polarizing plate which is combined with a view-enhancing antireflective film, brightness enhancement film, and/or an optical film having functional layer(s) such as a hard coat layer, forward-scattering layer, and antiglare layer. For details in this regard, the descriptions given in JP-A-No. 2012-082235, paragraphs 0229 to 0242, 0249, and 0250, and JP-A-No. 2012-215812, paragraphs 0086 to 0103, can be referred, the entire contents of which are hereby incorporated by reference.

As an example, the hard coat layer will be described below.

(Hard Coat Layer)

As desired, a hard coat layer can be provided on the cellulose acylate film. Containing the compound denoted by formula 1 into the cellulose acylate film increases adhesion to adjacent layers such as the hard coat layer. For example, a coating composition can be coated on the cellulose acylate film to cure it, forming a hard coat layer on the cellulose acylate film. By adding fillers and additives to the hard coat layer, it is possible to impart physical properties such as mechanical, electrical, and optical properties, and chemical properties such as water and oil repellence, to the hard coat layer. The thickness of the hard coat layer preferably falls within a range of 0.1 to 6 µm, more preferably within a range of 3 to 6 µm. The presence of a thin hard coat layer falling within this range makes it possible to obtain a polarizing plate containing a hard coat layer with improved physical properties such as toughness, inhibiting of curling, reduced weight, and lowered production cost.

An example of a coating composition for forming a hard coat layer contains an organic solvent and a monomer, oligomer, or polymer as a matrix-forming binder. Curing the coating composition following coating forms a hard coat layer. Curing can be achieved by a crosslinking reaction or polymerization reaction. The description given in JP-A-

2012-215812, paragraphs 0088 to 0101, the contents of which are hereby incorporated in their entirety by reference, can be referred, for details in this regard.

The coating composition can be prepared, for example, by dissolving and/or dispersing the above components in an organic solvent. A curable composition containing a (meth) acrylate compound is a suitable coating composition for forming the hard coat layer.

Liquid Crystal Display Device

The liquid crystal display device of an aspect of the present invention comprises at least one polarizing plate of an aspect of the present invention. For details regarding liquid crystal display devices, JP-A-No. 2012-082235, paragraphs 0251 to 0260, can be referred, the entire contents of which are hereby incorporated by reference. The polarizing plate of an aspect of the present invention can be employed as both a viewer-side polarizing plate and a backlight-side polarizing plate.

Although not exemplified, as another configuration, the polarizing plate of an aspect of the present invention can also be used as a part of a circular polarization plate disposed as the use application of antireflection of a reflective or semi-transmissive liquid crystal display device or a self light-emitting element such as an organic EL (Electro Luminescence).

EXAMPLES

Examples are given below to further specifically describe the present invention. Suitable modification of the materials, reagents, quantities and ratios of materials, operations and the like indicated in Examples below is possible without departing from the spirit of the present invention. Accordingly, the scope of the present invention is not limited to the specific examples given below.

1. Example of Manufacturing a Cellulose Acylate Film

—Forming a Cellulose Acylate Film—
(Preparation of Cellulose Acylate Solution)

The composition indicated below was placed in a mixing tank and stirred to dissolve the various components and prepare a cellulose acylate solution.

| Composition of cellulose acylate solution | |
|---|---|
| Cellulose acetate | 100.00 weight parts |
| Degree of acetyl substitution: 2.87; degree of polymerization: 370 | |
| Compound described in Table 3 below | Given in Table 3 |
| Methylene chloride (first solvent) | 353.9 weight parts |
| Methanol (second solvent) | 89.6 weight parts |
| n-Butanol (third solvent) | 4.5 weight parts |

The cellulose acylate solution that had been prepared above was flow cast using a drum flow casting device. Peeling was conducted with the quantity of residual solvent in the dope at about 70 weight %, and drying was conducted with the quantity of residual solvent at about 3 to 5 weight %. Subsequently, the film was further dried by being conveyed between the rolls of a heat treatment device, yielding a cellulose acylate film 60 μm in thickness.

2. Evaluation Methods (1) Measurement of Knoop Hardness of Cellulose Acylate Film The surface of a sample fixed on a glass substrate was measured under conditions of a loading period of 10 seconds, a creep period of 5 seconds, an unloading period of 10 seconds, and a maximum load of 50 mN with a Knoop indenter disposed with the minor axis of the indenter oriented in parallel to the direction of conveyance (longitudinal direction) during manufacturing of the cellulose acylate film in accordance with JIS Z 2251 employing a Fischerscope H100Vp model hardness meter made by Fischer Instruments (Ltd.). The hardness was calculated from the relation between the maximum load and the contact area of the indenter and sample obtained from the depth of indentation, and the average of the values obtained in five spots was calculated. These operations were conducted on 10 polymer films manufactured under the same conditions, and the arithmetic average of the values obtained was adopted as the Knoop hardness.

At the same indentation positions, measurements were taken while rotating the Knoop indenter in 10° increments. The omnidirectional Knoop hardness was measured in this manner by rotating through a total of 18 equal angular orientations. When the lowest value was obtained, it matched the value measured when the orientation of the minor axis of the Knoop indenter was positioned in parallel with the direction of conveyance (longitudinal direction) during manufacturing of the cellulose acylate film.

(2) Measurement of Degree of Moisture Permeability of Cellulose Acylate Film

The degree of moisture permeability of the cellulose acylate film was obtained by measuring the weight of water vapor passing through a sample over 24 hours in an atmosphere of 90% relative humidity at a temperature of 40° C. and converting this to the equivalent weight of water vapor passing through a sample surface area 1 $m^2$ over 24 hours with a film thickness of 60 μm in accordance with the degree of moisture permeability test (cup method) of JIS Z 0208. A degree of moisture permeability of less than or equal to 1,480 $g/m^2 \cdot day$ will effectively prevent deformation and deterioration of a polarizer by moisture when employed as a polarizing plate protective film, for example.

(3) Evaluation of Adhesion Between Cellulose Acylate Film and Hard Coat Layer (Preparation of Optical Film with Hard Coat Layer)

Hard coat layer solutions of the curable compositions indicated below were coated on the surfaces of the various cellulose acetate films prepared above and cured by irradiation with ultraviolet radiation to prepared optical films with hard coat layers. The hard coat layers were 6 μm in thickness.

| Curable composition of hard coat layer solution | | |
|---|---|---|
| Monomer | Pentaerythritol triacrylate/ pentaerythritolte tracrylate (mixing ratio by weight: 3/2) | 53.5 weight parts |
| Ultraviolet initiator | Irgacure (Japanese registered trademark) 907 (made by BASF Japan (Ltd.)) | 1.5 weight parts |
| Ethyl acetate | | 45.0 weight parts |

(Adhesion Evaluation Method)

A cross-cut test in accordance with JIS K 5600 was conducted on the optical films with hard coat layers prepared above. Specifically, an optical film with cured hard coat layer was irradiated for 48 hours with xenon (Xe) lamp. Following irradiation with Xe lamp, the hard coat layer was vertically and horizontally scored 11 times at intervals of 1 mm to form 100 squares measuring 1 mm on a side. Cellophane tape and Mylar tape were applied to the squares and rapidly peeled off. The location was then visually observed and the adhesion was evaluated on the evaluation scale given below. The irradiation with Xe lamp was conducted with a Super Xenon Weathermeter SX75 made by Suga Test Instrument Co., Ltd. Those cellulose acylate films evaluated "C" or higher were considered to have adequate practical adhesion as hard coats.

Adhesion Evaluation Scale
A: Squares peeled off in 0 to 35 places
B: Squares peeled off in 36 to 55 places
C: Squares peeled off in 56 to 80 places
D: Squares peeled off in 81 or more places

TABLE 3

|  | Compound | Content (weight parts) | Knoop hardness (N/mm$^2$) | Moisture permeability (g/m$^2$ · day) | Adhesion |
|---|---|---|---|---|---|
| Ex. 1 | Ex. Compound 7-11 | 10.0 | 214 | 1460 | C |
| Ex. 2 | Ex. Compound 4-13 | 10.0 | 216 | 1441 | C |
| Ex. 3 | Ex. Compound 1-2 | 10.0 | 225 | 1335 | A |
| Ex. 4 | Ex. Compound 1-13 | 10.0 | 227 | 1315 | A |
| Ex. 5 | Ex. Compound 3-13 | 10.0 | 228 | 1310 | A |
| Ex. 6 | Ex. Compound 5-12 | 10.0 | 212 | 1475 | C |
| Ex. 7 | Ex. Compound 1-21 | 10.0 | 221 | 1353 | B |
| Ex. 8 | Ex. Compound 3-11 | 10.0 | 230 | 1301 | A |
| Ex. 9 | Ex. Compound 3-11 | 8.0 | 227 | 1312 | A |
| Ex. 10 | Ex. Compound 3-11 | 15.0 | 235 | 1280 | A |
| Ex. 11 | Ex. Compound 1-22 | 10.0 | 217 | 1360 | B |
| Ex. 12 | Ex. Compound 1-23 | 10.0 | 217 | 1376 | C |
| Comp. Ex. 1 | Comp. Compound 1 | 10.0 | 195 | 1553 | D |
| Comp. Ex. 2 | Comp. Compound 2 | 10.0 | 210 | 1490 | D |
| Comp. Ex. 3 | Comp. Compound 2 | 5.0 | 187 | 2000 | D |

Comparative Compound 1

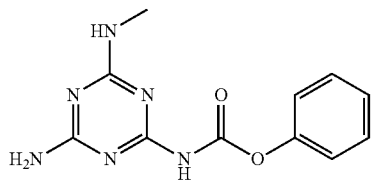

Comparative Compound 2

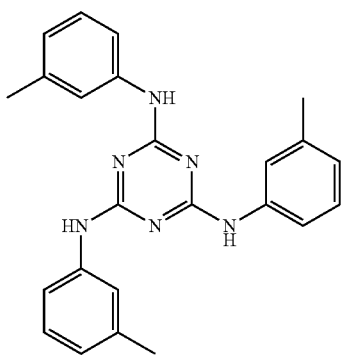

Comparative Example 1 is a compound described in JP-A-2012-67218, and Comparative Compound 2 is a compound described in JP-A-2006-22306.

Based on the results given in Table 3, the cellulose acylate films of the examples were found to exhibit better scratch resistance (Knoop hardness) and lower moisture permeability (degree of moisture permeability) than the cellulose acylate films of the comparative examples, and were found to exhibit good adhesion of the hard coat layer.

3. Example of Polarizing Plate Fabrication (1) Saponification Treatment of Polarizing Plate Protective Film The various cellulose acylate films obtained in the examples were immersed for 3 minutes at 55° C. in a 2.3 mol/L aqueous solution of sodium hydroxide. They were then cleaned in water washing baths at room temperature and neutralized with 0.05 mol/L sulfuric acid at 30° C. They were again cleaned in water washing baths at room temperature, and dried in 100° C. warm air. The surface of the cellulose acylate films was thus subjected to a saponification treatment.

(2) Fabrication of Polarizing Plate

Iodine was adsorbed onto a stretched polyvinyl alcohol film to fabricate a polarizer.

The saponified cellulose acylate film was laminated to one side of the polarizer with a polyvinyl alcohol adhesive. A commercial cellulose triacetate film (Fujitac TD80UF, made by Fujifilm (Ltd.)) was subjected to an identical saponification treatment and the commercial cellulose triacetate film that had been saponified was laminated to the surface of the polarizer on the opposite side from that on which the cellulose acylate film prepared above had been laminated.

In this process, the transmission axis of the polarizing agent was disposed in parallel with the slow axis of the cellulose acylate film obtained. The transmission axis of the polarizing agent was disposed perpendicularly with respect to the slow axis of the commercial cellulose triacetate film.

Various polarizing plates were thus fabricated.

A liquid crystal display device can be fabricated by incorporating the polarizing plates thus fabricated.

The present disclosure relates to the subject matter contained in Japanese Patent Application No. 2014-179684 filed on Sep. 3, 2014, which is expressly incorporated herein by reference in its entirety. All the publications referred to in the present specification are also expressly incorporated herein by reference in their entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

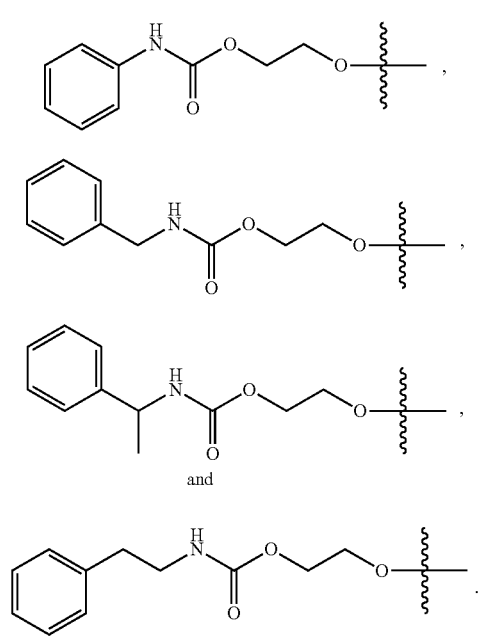

What is claimed is:

1. An optical film comprising a cellulose acylate film, which comprises a compound denoted by formula 2 below:

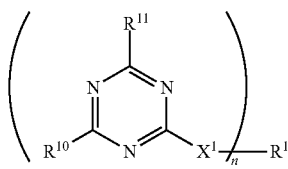

Formula 2 wherein, in formula 2, each of $R^{10}$ and $R^{11}$ independently denotes a substituent linked to the triazine ring through —$NR^{12}$— or —CO—, wherein $R^{12}$ denotes a hydrogen atom or an optionally substituted alkyl group; and wherein n, in formula 2, denotes 1; and moiety —$X^1$—$R^1$ in formula 2 is selected from the group consisting of partial structures 11 to 14;

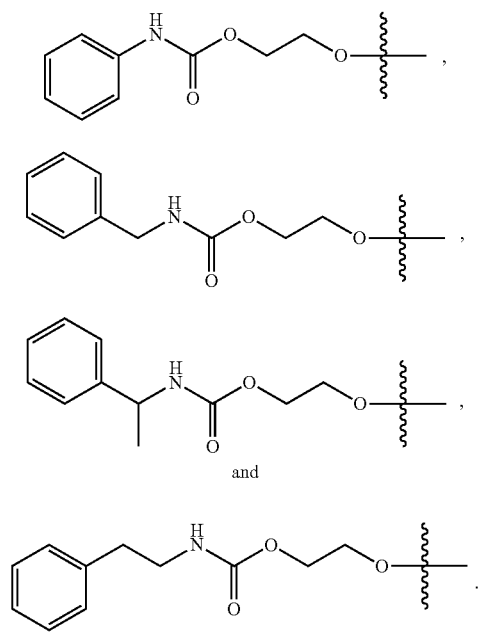

2. The optical film according to claim 1, wherein, in formula 2, at least either $R^{10}$ or $R^{11}$ denotes —$NR^{12}R^{13}$, and each of $R^{12}$ and $R^{13}$ independently denotes a hydrogen atom or an optionally substituted alkyl group.

3. The optical film according to claim 1, wherein, in formula 2, a ring structure is contained in at least one selected from the group consisting of $R^{10}$ and $R^{11}$.

4. The optical film according to claim 3, wherein the ring structure is an optionally substituted aromatic hydrocarbon ring.

5. The optical film according to claim 1, which comprises the compound denoted by formula 2 in a content ranging from 1.0 to 50.0 weight parts per 100.0 weight parts of cellulose acylate.

6. A polarizing plate,
which comprises a cellulose acylate film and a polarizer,
wherein the cellulose acylate film comprises a compound denoted by formula 2 below:

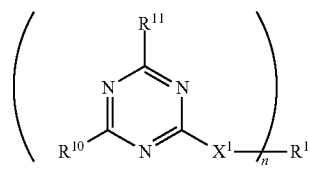

Formula 2 wherein, in formula 2, each of $R^{10}$ and $R^{11}$ independently denotes a substituent linked to the triazine ring through —$NR^{12}$— or —CO—, wherein $R^{12}$ denotes a hydrogen atom or an optionally substituted alkyl group; and wherein n, in formula 2, denotes 1; and moiety —$X^1$—$R^1$ in formula 2 is selected from the group consisting of partial structures 11 to 14;

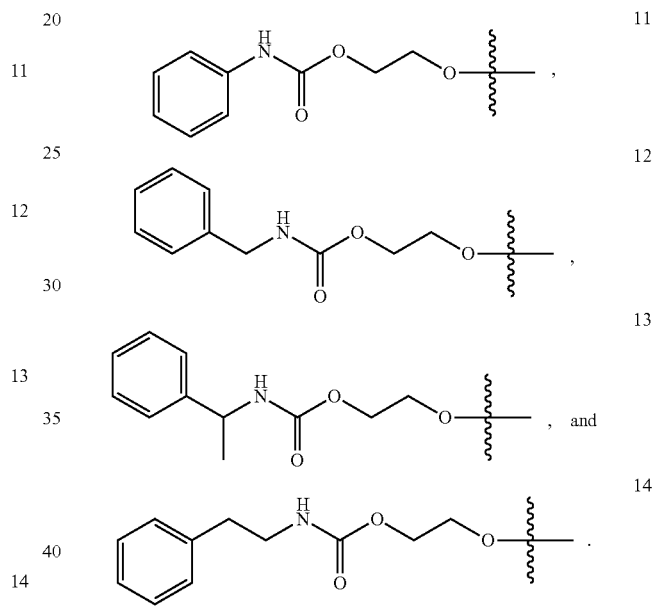

7. A liquid crystal display device,
which comprises a polarizing plate,
wherein the polarizing plate comprises a cellulose acylate film and a polarizer,
the cellulose acylate film comprises a compound denoted by formula 2 below:

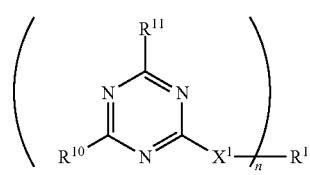

Formula 2 wherein, in formula 2, each of $R^{10}$ and $R^{11}$ independently denotes a substituent linked to the triazine ring through —$NR^{12}$— or —CO—, wherein $R^{12}$ denotes a hydrogen atom or an optionally substituted alkyl group; and wherein n, in formula 2, denotes 1; and moiety —$X^1$—$R^1$ in formula 2 is selected from the group consisting of partial structures 11 to 14;